United States Patent
Gallo et al.

(10) Patent No.: US 12,459,672 B2
(45) Date of Patent: *Nov. 4, 2025

(54) SYSTEM AND METHOD FOR IMPROVED AIR-LAUNCH OF A LAUNCH VEHICLE FROM A TOWED AIRCRAFT

(71) Applicant: Fenix Space, Inc., San Bernardino, CA (US)

(72) Inventors: Michael J. Gallo, San Bernardino, CA (US); Gregory M. Cole, Bend, OR (US)

(73) Assignee: Fenix Space, Inc., San Bernardino, CA (US)

( * ) Notice: Subject to any disclaimer, the term of this patent is extended or adjusted under 35 U.S.C. 154(b) by 17 days.

This patent is subject to a terminal disclaimer.

(21) Appl. No.: 18/407,376

(22) Filed: Jan. 8, 2024

(65) Prior Publication Data
US 2024/0199238 A1    Jun. 20, 2024

Related U.S. Application Data

(63) Continuation of application No. 17/386,189, filed on Jul. 27, 2021, now Pat. No. 11,866,202.

(51) Int. Cl.
*B64G 1/00*         (2006.01)
*B64D 3/00*         (2006.01)
(Continued)

(52) U.S. Cl.
CPC ............... *B64G 1/005* (2013.01); *B64D 3/00* (2013.01); *B64D 5/00* (2013.01); *B64G 1/641* (2013.01)

(58) Field of Classification Search
CPC . B64G 1/005; B64D 3/00; B64D 5/00; B64D 7/08; F41F 3/06; F41F 3/065
See application file for complete search history.

(56) References Cited

U.S. PATENT DOCUMENTS 1,418,783 A * 6/1922 Fokker ................ B64D 3/00
                                              280/480
2,389,132 A * 11/1945 Borgelt ............... H02G 7/056
                                                 244/3

(Continued)

FOREIGN PATENT DOCUMENTS

CN         108657432 A   * 10/2018
WO    WO-2024009293 A1   *  1/2024

OTHER PUBLICATIONS

Extended European Search Report of the European Patent Office per Rule 62 EPC in related European Patent Application No. 22927543.3 mailed May 26, 2025.

*Primary Examiner* — Joseph W Sanderson
(74) *Attorney, Agent, or Firm* — Master Key IP, LLP; Jeromye V. Sartain

(57) ABSTRACT

A launch system and method for orbital or suborbital air-launch of a payload involving releasably coupling a launch vehicle with a towed aircraft via an articulatable carriage to form an air-launch assembly, towing the air-launch assembly via a tow aircraft and interconnected tow cable to a first altitude, releasing the air-launch assembly from tow at or above the first altitude, activating the towed aircraft propulsion system and initiating a pull-up and climb maneuver of the towed aircraft to a second altitude, articulating the articulatable carriage to shift the air-launch assembly from a stowed position to a deployed position with the launch vehicle spaced from the towed aircraft, releasing the launch vehicle from the articulatable carriage and thus from the towed aircraft, and activating the launch vehicle propulsion system for further altitude gain or to meet specific mission requirements.

11 Claims, 13 Drawing Sheets

Figs. 4-8

(51) Int. Cl.
*B64D 5/00* (2006.01)
*B64G 1/64* (2006.01)

(56) References Cited

U.S. PATENT DOCUMENTS

| | | | | |
|---|---|---|---|---|
| 2,395,172 A * | 2/1946 | Dean | B64D 3/00 | 244/3 |
| 2,396,453 A * | 3/1946 | Windle | B64D 3/00 | 244/3 |
| 2,422,662 A * | 6/1947 | Fahrney | B64D 3/00 | 244/3 |
| 2,425,309 A * | 8/1947 | Ennis | B64D 5/00 | 280/480 |
| 2,432,548 A * | 12/1947 | Taylor | B64D 3/00 | 244/3 |
| 2,433,893 A * | 1/1948 | Cowgill, Jr. | B64D 3/00 | 254/374 |
| 2,440,737 A * | 5/1948 | Cawein | H01Q 1/30 | 343/707 |
| 2,449,532 A * | 9/1948 | Leydorf | G01S 1/02 | 340/979 |
| 2,460,194 A * | 1/1949 | Schultz | B63G 7/04 | 244/3 |
| 2,481,542 A * | 9/1949 | Schuyler | B64D 1/04 | 89/1.819 |
| 2,621,005 A * | 12/1952 | Turpin | F16L 3/2053 | 248/575 |
| 2,649,262 A * | 8/1953 | Fahrney | G05D 1/0038 | 244/3 |
| 2,723,812 A * | 11/1955 | Hohmann | B64F 1/08 | 244/3 |
| 2,958,260 A * | 11/1960 | Anderson | F41F 3/06 | 89/1.51 |
| 3,008,376 A * | 11/1961 | Brunow | F41F 3/06 | 89/1.51 |
| 3,113,747 A * | 12/1963 | Smith | B64D 5/00 | 244/3 |
| 3,273,459 A * | 9/1966 | Lardin | B64D 1/06 | 294/82.26 |
| 3,766,828 A * | 10/1973 | Cords | B64D 7/00 | 89/1.816 |
| 3,771,412 A * | 11/1973 | Lebovitz | F41F 3/052 | 89/1.807 |
| 3,799,478 A * | 3/1974 | Costes | B64D 1/04 | 244/137.4 |
| 3,871,604 A * | 3/1975 | Coutin | B64D 1/06 | 244/137.4 |
| 3,958,455 A * | 5/1976 | Russell | D07B 1/145 | 73/862.68 |
| 3,968,725 A * | 7/1976 | Holzhauer | D04C 1/12 | 57/244 |
| 4,106,389 A * | 8/1978 | Walley | F41F 3/06 | 89/1.816 |
| 4,423,661 A * | 1/1984 | Sheldon | F41F 3/0406 | 89/1.819 |
| 4,440,365 A * | 4/1984 | Holtrop | B64D 1/02 | 244/137.4 |
| 4,600,171 A * | 7/1986 | Kalisz | B64D 1/04 | 244/137.1 |
| 4,660,456 A * | 4/1987 | Griffin | F41F 3/06 | 89/1.819 |
| 4,685,377 A * | 8/1987 | Mace | B64D 7/08 | 244/137.4 |
| 4,736,669 A * | 4/1988 | Long | B64D 7/08 | 89/1.819 |
| 4,802,400 A * | 2/1989 | Griffin | F41F 3/06 | 89/1.819 |
| 4,829,878 A * | 5/1989 | Thompson | B64D 7/08 | 244/137.4 |
| 5,083,723 A * | 1/1992 | Grieb | B64D 3/02 | 244/3 |
| 5,148,734 A * | 9/1992 | Lilly | F41F 3/06 | 89/1.819 |
| 5,295,642 A * | 3/1994 | Palmer | B64G 1/14 | 244/171.4 |
| 5,626,310 A * | 5/1997 | Kelly | B64D 5/00 | 244/171.4 |
| 6,012,407 A * | 1/2000 | Farley | B63B 21/56 | 114/215 |
| 6,029,928 A * | 2/2000 | Kelly | B64D 3/00 | 244/171.4 |
| 6,119,617 A * | 9/2000 | Oswell | B63B 34/67 | 114/215 |
| 6,220,543 B1 * | 4/2001 | Uskolovsky | B64D 3/00 | 244/3 |
| 6,250,195 B1 * | 6/2001 | Mendoza | B64D 7/08 | 89/1.51 |
| 6,913,224 B2 * | 7/2005 | Johansen | B64G 1/005 | 244/3 |
| 6,926,226 B2 * | 8/2005 | Gathier | B64D 5/00 | 244/2 |
| 7,125,031 B1 * | 10/2006 | Schoonover | B60D 1/586 | 280/491.3 |
| 7,458,544 B1 * | 12/2008 | Sarigul-Klijn | B64D 1/12 | 244/137.4 |
| 8,262,015 B2 * | 9/2012 | Kuroda | B64G 1/005 | 244/3 |
| 8,727,264 B1 * | 5/2014 | Rutan | B64D 1/12 | 244/171.1 |
| 8,910,902 B2 * | 12/2014 | Speer | B64D 3/02 | 244/1 TD |
| 8,960,590 B2 * | 2/2015 | Rutan | B64G 1/005 | 244/1 TD |
| 9,211,772 B2 * | 12/2015 | Brown | B60D 1/18 | |
| 9,944,410 B1 * | 4/2018 | Budd | B64D 5/00 | |
| 10,106,273 B2 * | 10/2018 | Burgener | B64G 1/14 | |
| 10,384,797 B2 * | 8/2019 | Burgener | B64C 37/02 | |
| 11,014,671 B2 * | 5/2021 | Gallo | B64C 31/02 | |
| 11,027,844 B2 * | 6/2021 | von Flotow | B64U 10/25 | |
| 11,460,273 B2 * | 10/2022 | Livingstone | F41G 9/02 | |
| 11,866,202 B2 * | 1/2024 | Gallo | B64G 1/641 | |
| 2005/0067524 A1 | 3/2005 | Johansen | | |
| 2006/0208136 A1 * | 9/2006 | Cook | B64G 1/005 | 244/171.3 |
| 2011/0024548 A1 * | 2/2011 | Kuroda | B64D 3/00 | 244/3 |
| 2012/0091259 A1 * | 4/2012 | Morris | B64C 19/00 | 244/17.11 |
| 2013/0062464 A1 * | 3/2013 | Speer | B64D 3/02 | 244/1 TD |
| 2015/0021428 A1 * | 1/2015 | Rutan | B64D 1/12 | 244/3 |
| 2016/0363685 A1 * | 12/2016 | Giordana | H01R 24/00 | |
| 2018/0265211 A1 * | 9/2018 | Burgener | B64D 3/00 | |
| 2019/0168887 A1 * | 6/2019 | Burgener | B64D 3/00 | |
| 2020/0047885 A1 * | 2/2020 | Gallo | B64D 1/12 | |
| 2020/0156790 A1 * | 5/2020 | von Flotow | B64F 1/04 | |
| 2023/0034258 A1 * | 2/2023 | Gallo | B64G 1/005 | |

* cited by examiner

SYSTEM AND METHOD FOR IMPROVED AIR-LAUNCH OF A LAUNCH VEHICLE FROM A TOWED AIRCRAFT

RELATED APPLICATIONS

This is a continuation application and so claims the benefit pursuant to 35 U.S.C. § 120 of a prior filed and co-pending U.S. Non-Provisional Patent Application Ser. No. 17/386,189 filed Jul. 27, 2021, and entitled "System and Method for Improved Air-Launch of a Launch Vehicle from a Towed Aircraft." The contents of the aforementioned application are incorporated herein by reference.

BACKGROUND

The subject of this patent application relates generally to launch vehicle air-launch employing a towed aircraft, and more particularly to launch systems and methods for selectively powering and operating the towed aircraft and selectively shifting the launch vehicle from a stowed position to a deployed position relative to the towed aircraft at or prior to launch vehicle release and launch.

The following description includes information that may be useful in understanding the present invention. It is not an admission that any of the information provided herein is prior art or relevant to the presently claimed invention, or that any publication specifically or implicitly referenced is prior art.

Applicant(s) hereby incorporate herein by reference any and all patents and published patent applications cited or referred to in this application, to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

Despite early successes of tow-launch and some studies indicating that such may be a preferred alternative to ground-launch and conventional air-launch, and thus a preferred space launch approach generally, for satellite and other orbital deployment as well as suborbital applications, challenges have remained, including around the objective of optimizing such a modified air-launch approach wherein the launch vehicle is air-launched from a towed aircraft rather than a conventional aircraft. Key design, construction, assembly, and integration considerations for the safe, sound, and effective use of such tow-launch techniques involve, and in many respects hinge on, the means or methods of taking off with, carrying, deploying, and releasing or launching the launch vehicle and its payload relative to the towed aircraft. Numerous variables relate to weight and lift, energy requirements, altitude, airspeed, airflow and other aerodynamic influences, release angle, and other launch requirements and flight profile and/or launch sequence characteristics. A related and specific challenge is safely and effectively separating the launch vehicle from the towed aircraft at the desired altitude and orientation while avoiding any impact or recontact of the launch vehicle and towed aircraft, which could be catastrophic, as the two bodies are decoupled and move independently in relation to each other.

Aspects of the present invention fulfill these needs and provide further related advantages as described in the following summary.

SUMMARY

Aspects of the present invention teach certain benefits in construction and use which give rise to the exemplary advantages described below.

The present invention solves the problems described above by providing a new and improved launch system and method for orbital or suborbital air-launch of a payload.

In at least one embodiment, a launch system for orbital or suborbital air-launch of a payload comprises: a tow aircraft; a towed aircraft selectively in tow behind the tow aircraft at take-off and in flight via an interconnected tow cable, the towed aircraft having a towed aircraft body defining a towed aircraft central axis and being selectively powered as by having a throttleable and restartable towed aircraft propulsion system installed on or within the towed aircraft to perform a pull-up and climb upon release of the towed aircraft from tow at a desired first altitude; a launch vehicle releasably carried on the towed aircraft, the launch vehicle having a launch vehicle body defining a launch vehicle diameter and a launch vehicle central axis and being selectively powered as by having a launch vehicle propulsion system installed on or within the launch vehicle for propulsion upon release of the launch vehicle from the towed aircraft at a desired second altitude; and an articulatable carriage releasably coupling the launch vehicle with the towed aircraft, the towed aircraft, launch vehicle, and articulatable carriage together defining an air-launch assembly, the articulatable carriage configured for selectively shifting the launch vehicle between a stowed position adjacent to the towed aircraft and a deployed position spaced from the towed aircraft, thereby allowing for reduced drag between the two bodies with the launch vehicle in the stowed position during tow and during pull-up and climb after release from tow and further allowing for reduced adverse aerodynamic effects between the two bodies such as aerodynamic forces tending to draw the two bodies together, precise alignment of the two bodies' angles of attack taking into account the individual flow fields and their interaction between bodies, and providing an initial longitudinal velocity differential between the towed aircraft and the launch vehicle with the launch vehicle in the deployed position at release of the launch vehicle from the towed aircraft, whereby upon release of the launch vehicle from the towed aircraft the towed aircraft flight path diverges from the launch vehicle flight path and the launch vehicle propulsion system is powered to air-launch the launch vehicle and deliver the payload to higher altitude.

In at least another embodiment, a method of employing a launch system for orbital or suborbital air-launch of a payload comprises the steps of: releasably coupling the launch vehicle with the towed aircraft via the articulatable carriage to form the air-launch assembly; configuring the air-launch assembly in the stowed position with the launch vehicle adjacent to the towed aircraft; towing the air-launch assembly via the tow aircraft and interconnected tow cable to the first altitude; releasing the air-launch assembly from tow at or above the first altitude; powering the towed aircraft propulsion system and initiating a pull-up and climb maneuver of the towed aircraft to the second altitude, the second altitude being more than 10,000 feet greater than the first altitude; articulating the articulatable carriage to shift the air-launch assembly to the deployed position with the launch vehicle spaced from the towed aircraft so as to minimize aerodynamic influences between the launch vehicle and the towed aircraft; releasing the launch vehicle from the articulatable carriage and thus from the towed aircraft; and powering the launch vehicle propulsion system for further altitude gain or to meet specific mission requirements.

Other objects, features, and advantages of aspects of the present invention will become more apparent from the following detailed description, taken in conjunction with the accompanying drawings, which illustrate, by way of example, the principles of aspects of the invention.

BRIEF DESCRIPTION OF THE DRAWINGS

The accompanying drawings illustrate aspects of the present invention. In such drawings.

Figure 1:
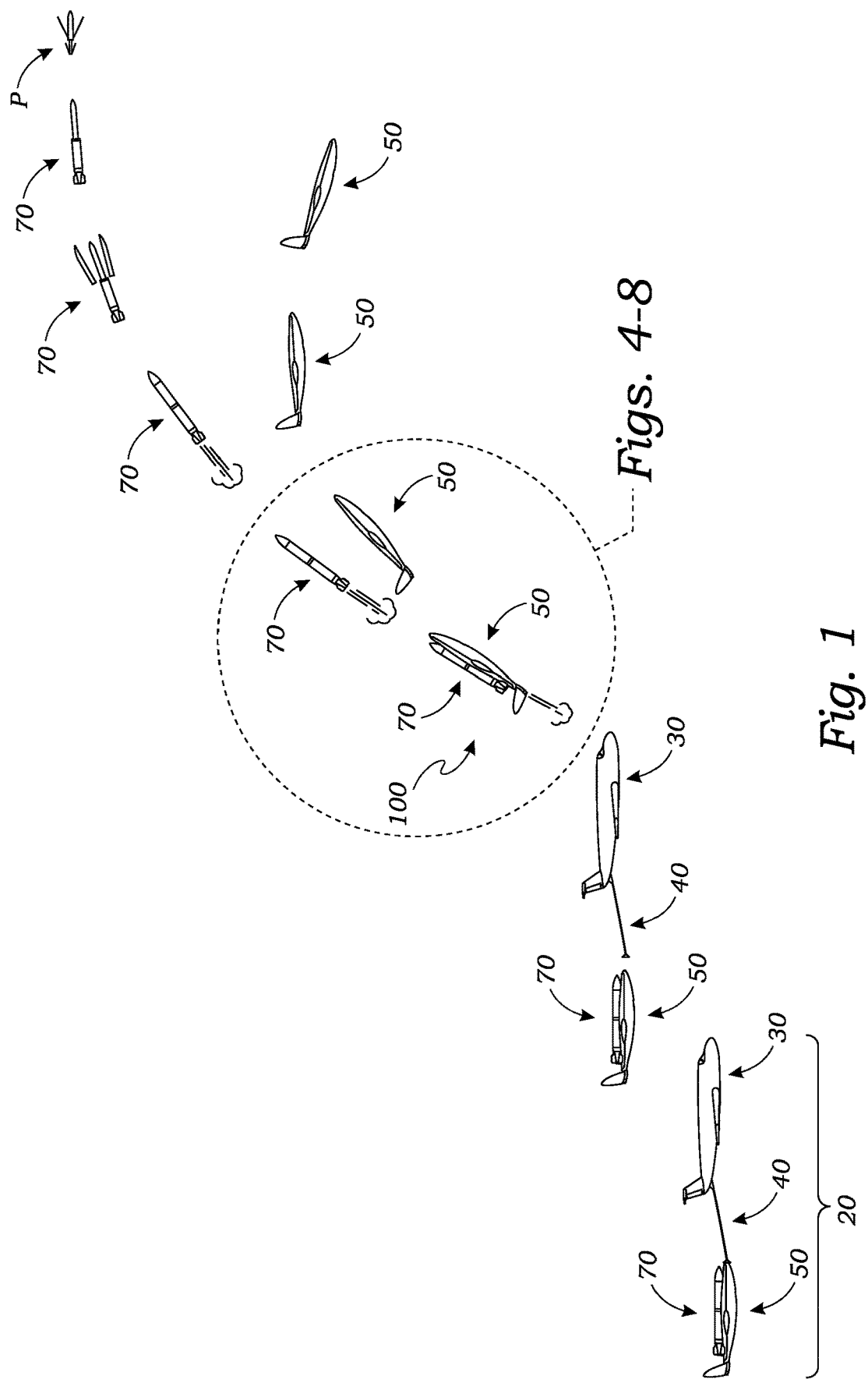
FIG. 1 is a schematic view of an exemplary flight profile of a launch system, in accordance with at least one embodiment.

The above described drawing figures illustrate aspects of the invention in at least one of its exemplary embodiments, which are further defined in detail in the following description. Features, elements, and aspects of the invention that are referenced by the same numerals in different figures represent the same, equivalent, or similar features, elements, or aspects, in accordance with one or more embodiments. More generally, those skilled in the art will appreciate that the drawings are schematic in nature and are not to be taken literally or to scale in terms of material configurations, sizes, thicknesses, and other attributes of a system according to aspects of the present invention and its components or features unless specifically set forth herein.

DETAILED DESCRIPTION

The following discussion provides many exemplary embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

While the inventive subject matter is susceptible of various modifications and alternative embodiments, certain illustrated embodiments thereof are shown in the drawings and will be described below in detail. It should be understood, however, that there is no intention to limit the invention to any specific form disclosed, but on the contrary, the inventive subject matter is to cover all modifications, alternative embodiments, and equivalents falling within the scope of the claims.

Turning now to FIG. 1, there is shown a schematic view of an illustrative flight profile of an exemplary embodiment of a launch system 20 according to aspects of the present invention. The system 20 comprises, in the exemplary embodiment, a tow aircraft 30 with a towed aircraft 50 selectively in tow behind the tow aircraft 30 via a tow cable 40, the towed aircraft 50 top-carrying a launch vehicle 70 configured to house a payload P and for selectively being shifted from a stowed position to a deployed position relative to the towed aircraft 50 for release and launch of the launch vehicle 70. While somewhat traditional and non-descript tow aircraft 30 and towed aircraft 50 are shown, it will be appreciated that the invention is not so limited but may entail any towing body or towed body now known or later developed suitable for any such towed flight and launch vehicle air-launch application. Particularly, though the towed aircraft 50 is towed behind the tow aircraft 30 during portions of the launch sequence or flight profile and is thus labeled "towed aircraft" as distinct from the "tow aircraft," it will be appreciated from the present disclosure that the towed aircraft 50 is also capable during portions of the launch sequence or flight profile of the overall system 20 of independent gliding flight and powered flight and thus while also referred to as a "glider," the towed aircraft 50 is in no way limited to being configured as a glider versus other winged bodies now known or later developed any more than it is limited to being only in tow or "towed." Similarly, while a non-descript tow cable 40 is shown, such can be any appropriate cable or other structure capable of temporarily connecting or tethering the tow and towed aircraft 30, 50 even under load or tension as in flight, including but not limited to any tow cable and related system and component configurations disclosed in commonly-owned U.S. Pat. No. 11,014,671 filed May 7, 2018 and granted May 25, 2021 and entitled "Tow Cable System and Method of Use." As a threshold matter, then, it will be appreciated by those skilled in the art that the schematic "flight profile" of FIG. 1 is a simplified representation that is not to be taken literally or to scale. Relatedly, it is to be understood that the towing plane or tow aircraft 30 can take a wide variety of forms, now known or later developed, depending on numerous factors, particularly the size and weight of any towed aircraft 50 and its launch vehicle 70 and any payload P it contains, such that the non-descript aircraft 30 is merely illustrative. Likewise, the towed aircraft 50 may again take a variety of forms, now known or later developed, as configured for being selectively pulled or towed by the tow aircraft 30 via the tow cable 40 and for temporarily securing a launch vehicle 70 on or adjacent to the towed aircraft 50, again depending on the size and characteristics of the launch vehicle 70 and its payload P, such as a satellite to be deployed into orbit around the earth, instrumentation or other experimental equipment, cargo, etc., for orbital and/or suborbital applications. Generally, those skilled in the art will appreciate that in such a tow-launch context because the glider 50 does not have to have a propulsion system and fuel load to power the glider 50 off the runway and throughout its towed flight, it is able to carry a relatively much heavier load, with propulsion provided from the tow aircraft 30. The amount of weight that can be carried by the glider 50 is generally calculated by multiplying the available excess thrust capacity of the tow aircraft 30 by the lift to drag (L/D) ratio of the glider 50, which of course is aircraft dependent, as the available excess thrust of the tow aircraft 30 is dictated primarily by the kind of aircraft it is and thus its features such as its weight (e.g., cabin configuration, fuel load, baggage, passengers, etc.) and the operating thrust of the specific engines or other propulsion device(s) or system(s) installed on the tow aircraft 30. Accordingly, it will be appreciated that a virtually infinite variety of tow and towed aircraft 30, 50 configurations, whether now known or later developed, may be employed, which in turn would impact the overall flight profile and performance characteristics, such that the schematic representations of the tow and towed aircraft 30, 50 in the drawings are to be understood as merely illustrative and expressly non-limiting. Relatedly, while a "top-carry" arrangement of the launch vehicle 70 on the towed aircraft 50 is shown and described, it will be appreciated that a number of other arrangements, including bottom-carry and internal-carry, are possible according to aspects of the present invention, such that the exemplary embodiment is to be understood as illustrative and non-limiting. Such a towed aircraft 50 may be a fixed or maneuverable wing craft with one or more fuselage, may be manned or unmanned (remotely controlled), and may be in the form of a glider or a light aircraft that is designed to fly for long periods without necessarily using an engine or other propulsion, though being equipped with a selectively employed propulsion system 52 (FIG. 2) for take-off assist, abortment or other recovery, and maintaining speed and climbing to its final altitude for air-launch of the launch vehicle 70, more about which is said below and which propulsion system 52 may be configured in any appropriate manner now known or later developed and thus may be positioned as appropriate on or in any portion of the towed aircraft 50, including but not limited to its fuselage or body 54. Finally, the launch vehicle 70 may also take various 20) forms, now known or later developed, but is typically configured as a rocket that may selectively detach from the towed aircraft 50 in flight and so be launched via activation of its propulsion system 72 (FIG. 7), such that as for the tow and towed aircraft 30, 50, the schematic representations of the launch vehicle 70 in the drawings are also to be understood as merely illustrative and expressly non-limiting. Relatedly, it will be appreciated that while the launch vehicle 70 is shown as having fins 80, such is not required, and, for example, a thrust vectoring nozzle or other launch vehicle stabilizing approach may instead be employed. In other exemplary embodiments, it will be appreciated that the launch vehicle 70 may be a propulsion system, ordinance, aero vehicle, fairing, projectile, container, carrier, cannister, or any other physical element intended to be separated from an aircraft at any point in flight and to itself carry and facilitate the release or launch of any payload P. And though not shown, a temporary "umbilical cord" connection between the towed aircraft 50 and the launch vehicle 70 may be provided for communications and/or fuel transfer between the bodies in flight in a manner now known or later developed in the art.

Figure 2:
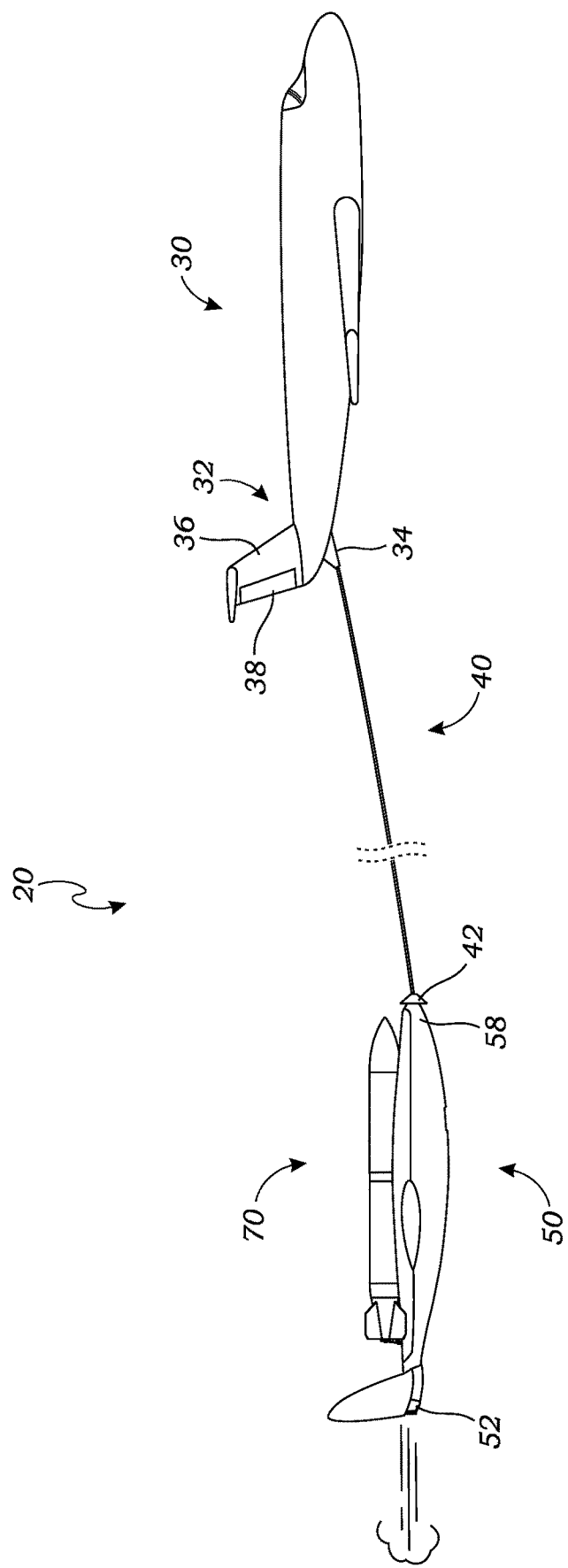
FIG. 2 is an enlarged schematic side view depicting an exemplary towed aircraft and launch vehicle as in FIG. 1 in tow behind a tow aircraft, in accordance with at least one embodiment.
Figure 3:
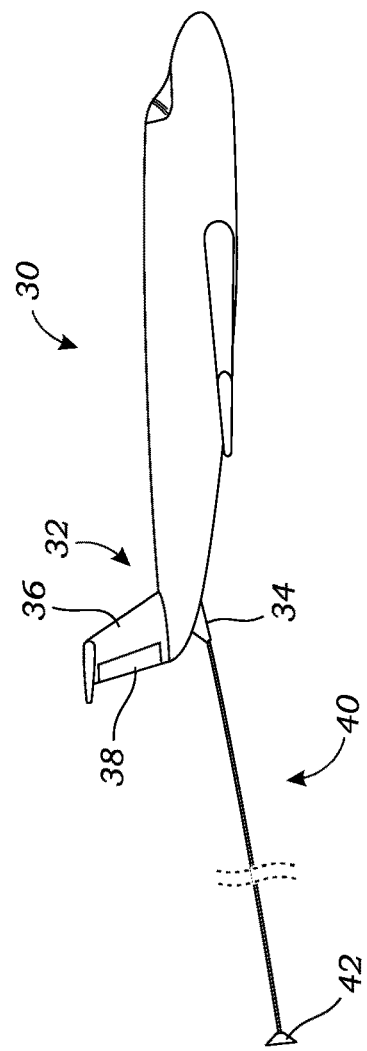
FIG. 3 is a further schematic side view depicting the exemplary towed aircraft and launch vehicle as in FIG. 2 now released from tow behind the tow aircraft, in accordance with at least one embodiment.
Figure 3:
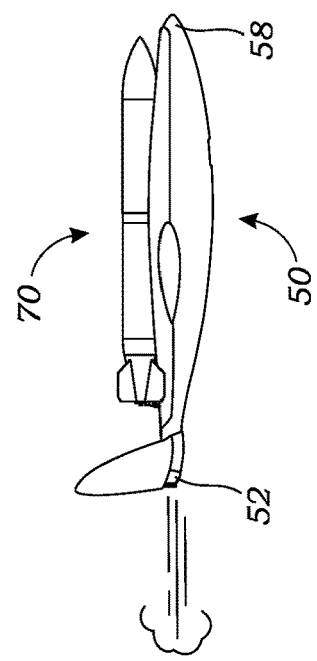

With continued reference to FIG. 1, the overall launch system 20 once more is represented by the tow aircraft 30, the tow cable 40, and the towed aircraft 50 with launch vehicle 70. In the exemplary "launch sequence" or "flight profile," the tow aircraft 30 and the towed aircraft 50 take off from a conventional runway or other strip with the towed aircraft 50 under tow via the tow cable 40. Typically, a runway on the order of 10,000 feet or longer would be employed, though it will be appreciated that such is not required and can vary depending on a number of factors such as the size of the tow and towed aircraft 30, 50 and the propulsion systems of both and the length of the tow cable 40, such that in some contexts runways less than 10,000 feet may be employed—indeed, by way of illustration and not limitation, operation of the propulsion system 52 of the glider 50 for take-off assist as discussed herein may enable the use of a relatively shorter runway all else being equal. As shown in the enlarged side schematic view of FIG. 2, in the illustrated embodiment, one end of the tow cable 40 is fixed to or passes through and out of a pylon 34 or other structure at or in the vicinity of the tail 32 of the aircraft 30, which tail 32 may include a vertical stabilizer 36 with rudder 38 for turning or banking the aircraft 30 during flight in a manner known in the art. It should be noted that any such tow cable 40 may attach at other locations on the tow aircraft that could facilitate towing operations, such as a wing pylon or device mounted elsewhere on the tow aircraft 30. The opposite end of the tow cable 40 is configured with a connector 42 for removable engagement with the glider or towed aircraft 50—in the exemplary embodiment such engagement is at the nose 58, though it will be appreciated by those skilled in the art that other coupling locations and means for temporarily or selectively attaching the tow cable 40 to the towed aircraft 50 are possible according to aspects of the present invention without departing from its spirit and scope. Notably, as shown in FIG. 2, a propulsion system 52 of the towed aircraft 50 may be ignited at take-off and during initial flight to provide take-off assist to the tow aircraft 30, thus requiring relatively less propulsion or thrust from the tow aircraft 30 relative to the towed aircraft 50 (its weight and drag, including the launch vehicle 70 and any payload P). It will be appreciated that optimized thrust may be provided by the glider or towed aircraft 50 via its propulsion system 52 to assist the tow aircraft 30 with take-off and climb while the towed aircraft 50 at all times remains under tow so as to minimize slack in the tow cable 40, which could be catastrophic, or so as to ensure that the tow cable remains in tension. Indeed, in the cited commonly-owned U.S. Pat. No. 11,014,671 there is disclosed a tow cable system and method for preventing the "bungee effect" in a tow line during towed flight of a glider behind an aircraft as by maintaining positive load or tension therebetween, which is contributed to by flight maneuvers and parameters as well as cable design/materials, cable pre-tensioning, in-flight cable tensioning, and/or load dampening device(s), and the related interplay of such various components or sub-systems of the overall tow cable system and related control loop or feedback loop, which disclosure is incorporated herein by reference and which tow cable system and method may be employed, in whole or in part, in a launch system 20 according to aspects of the present invention. At take-off, and whether the towed aircraft 50 is powered, as through its propulsion system 52, or unpowered, while the two aircraft 30, 50 may take off somewhat simultaneously or even the towed glider 50 could take off first, in the exemplary system 20 and related flight profile, for safety and again in the interest of maintaining tension at all times in the tow cable 40, the tow aircraft 30 takes off first and stabilizes at about 200 feet before the towed aircraft 50 takes off, with a spoiler, flap, aileron, or other adjustable structure (not shown) on the wing 60 of the towed aircraft 50 helping to keep the towed aircraft 50 on the ground until take-off is desired, which spoiler or the like may also be employed for in-flight control of the towed aircraft 50 (e.g., braking while in tow to maintain desired tow cable tension or climbing, turning, or banking once detached from the tow aircraft 30). Once the tow aircraft 30 and glider or towed aircraft 50 are airborne, the two climb together to the desired altitude for towed aircraft 50 separation and flight, typically about 35,000-40,000 feet, at which point the tow cable 40 is released from the towed aircraft 50 and the tow aircraft 30 steers away from the towed aircraft 50 and its flight path and lands at any designated location. It is noted that during such climb or likely from about 1,000 feet altitude until the desired separation altitude is reached the towed aircraft propulsion system 52 would be shut off and the towed aircraft 50 towed to the separation altitude as an unpowered glider, it being appreciated that the weight of fuel or propellant stored within the towed aircraft 50 is thus minimized, with the propulsion system 52 and related propellant optimized for take-off assist, abortment recovery, pull-up and climb, and recovery of the towed aircraft 50 as part of the overall flight profile or launch sequence, though in other embodiments the towed aircraft 50 propulsion may be employed throughout all or a larger portion of its flight, even at a lower throttle position, so as to reduce demand on the propulsion system of the tow aircraft 30, all such approaches being within the scope of the present invention. In the case of the towed aircraft 50 being towed to separation altitude as an unpowered glider, it follows that at the point of separation of the towed aircraft 50 from the tow aircraft 30 as through detachment of the tow cable 40 as shown in FIG. 3, whether just prior to tow cable 40 release, simultaneous with tow cable 40 release, or just after tow cable 40 release, the towed aircraft propulsion system 52 may be started/restarted or ignited/reignited to power the now separated towed aircraft 50 through the next phase of its flight profile involving pull-up and climb to higher inclination and altitude for eventual air-launch of the launch vehicle 70 carried by the towed aircraft 50, as described in more detail below with reference to FIGS. 4-8. Generally, with the glider propulsion system 52 thus providing propulsion after release from tow to again support pull-up and climb, the glider 50 then flies independent of the tow aircraft 30 somewhat vertically to a launch altitude of approximately 45,000-50,000 feet or more, often up to roughly 65,000 feet altitude, at which point the launch vehicle 70 separates from the glider or towed aircraft 50, its propulsion system 72 (FIG. 4) is started or ignited, and so it proceeds through one or more stages to the final orbital elevation or suborbital destination, while the glider or towed aircraft 50 having separated from the launch vehicle 70 returns to earth for possible further flights or service. Those skilled in the art will appreciate that this general tow-launch summary is merely illustrative and non-limiting. With continued reference to FIGS. 1-3, the tow cable connector 42 is shown as being somewhat conical, or having a conical or foil-shaped shroud that alone or together with a parachute (not shown) or other such structure may be provided on the free end of the cable 40 to keep some tension on the cable 40 after release from the towed aircraft 50 and prevent whipping of the cable 40. Instead or additionally, a take-up reel (not shown) may be provided within the tow aircraft 30 so as to reel the tow cable 40 in for a safe remainder of the flight and landing of the tow aircraft 30 and to prevent damage to the tow cable 40 during landing for possible cable 40 reuse. As a further alternative, the tow cable can be released from the tow aircraft 30 once it is closer to the ground so that it is not drug along the ground and potentially damaged as the aircraft 30 lands. And as a still further embodiment, the tow cable 40 may be capable of reacquiring the towed aircraft 50 after it completes its pull-up and climb maneuver and air-launch of the launch vehicle 70, including in the reel situation reeling the tow cable 40 in after initial release from tow of the towed aircraft 50 and then reeling or letting the tow cable 40 back out to facilitate reacquisition of the towed aircraft 50 as a potential means of further extending the overall range of the launch system 20.

Figure 4:
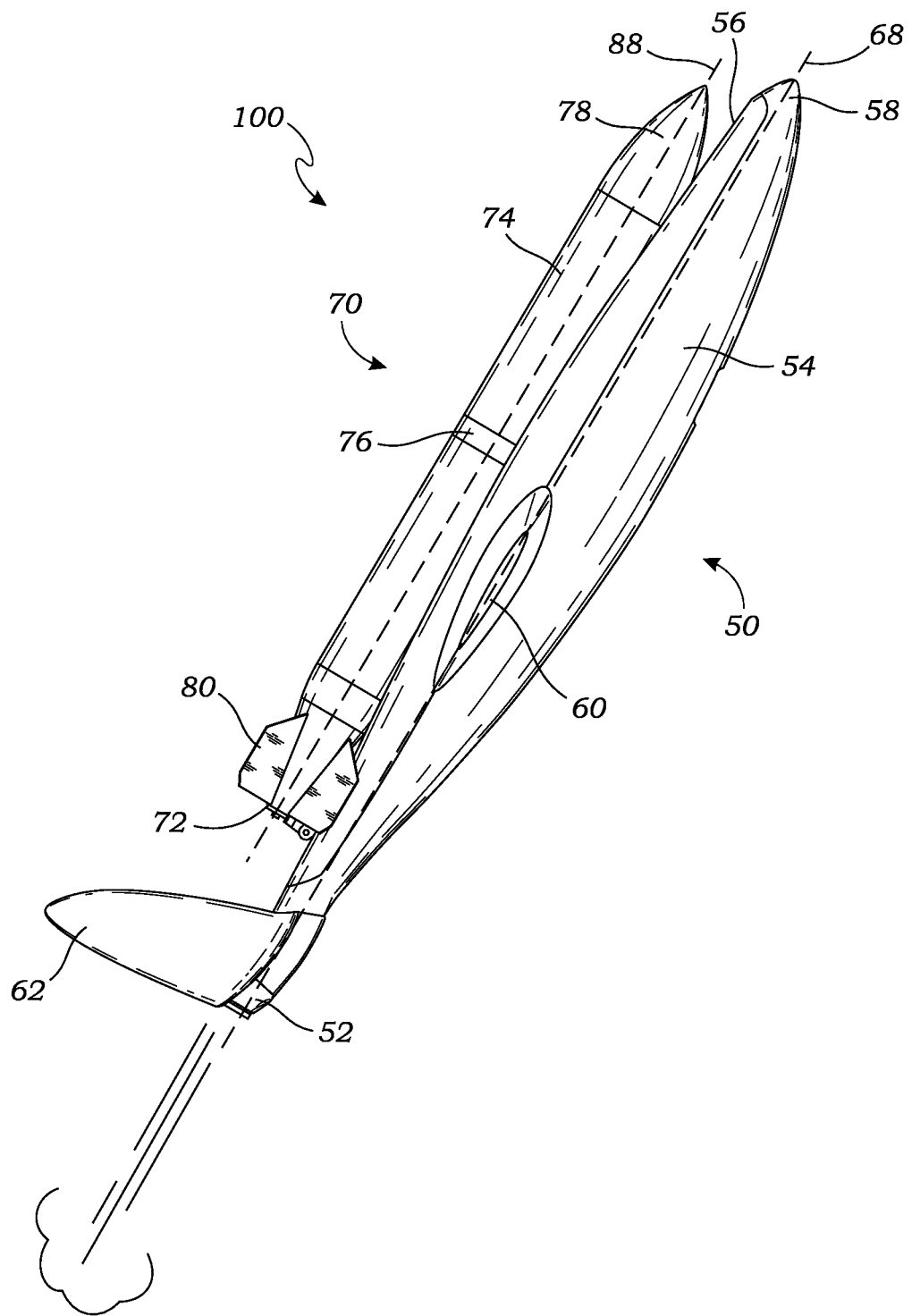
FIG. 4 is an enlarged schematic side view depicting an exemplary towed aircraft and launch vehicle as in FIG. 1 released from tow and in a first operational mode, in accordance with at least one embodiment.

Referring still to the overall flight profile of FIG. 1 and now with particular reference to FIGS. 4-8 as well, there are shown enlarged side schematic views of the combined glider or towed aircraft 50 and launch vehicle 70, together designated as air-launch assembly 100 of the overall launch system 20 along with the carriage 90 coupling the two, here illustrating the exemplary launch vehicle 70 air-launch sequence portion of the flight profile. Those skilled in the art will again appreciate that such schematic views are illustrative and non-limiting and are not to be taken literally or to scale in terms of the configurations of and relative sizes or spacing of the towed aircraft 50 and the launch vehicle 70 or their speeds or relative positions, orientations, or movement at any given time, unless indicated otherwise. First, as shown in FIG. 4, the air-launch assembly 100 comprising the towed aircraft 50 and launch vehicle 70 has completed a pull-up maneuver, or the towed aircraft 50 has brought its nose 58 up as through the use of its propulsion system 52 and adjustment of any wing 60 spoiler, flap, aileron, or the like, tail 62 elevator, or other such adjustable structure, device, or flight control measure on the towed aircraft 50 so that the air-launch assembly 100 is traveling at an increased flight path angle or trajectory relative to the ground (e.g., 75°). In the exemplary embodiment, the towed aircraft propulsion system 52 has a fixed nozzle such that all steering of the glider or towed aircraft 50 once separated from the tow aircraft 30, including the pull-up maneuver, is achieved via adjustable surfaces in any manner now known or later developed in the art, though it will be appreciated that instead or in addition the glider propulsion system 52 may be configured with a gimbaled, pivotable, or otherwise adjustable nozzle to provide thrust or steering control through the propulsion system 52 in any manner now known or later developed in the art. It will be appreciated that the ultimate increased flight path angle achieved by the air-launch assembly 100, or the towed aircraft 50 specifically, is dependent on a number of factors, as is the altitude gained and the time it takes to achieve such increased flight path angle and increased altitude, including the flight profile and related orbital objective, the characteristics of the towed aircraft 50 and the launch vehicle 70, and the weight of the payload P. It will also be appreciated that the higher the altitude, the lower the gravitational and atmospheric effects—for example, atmospheric pressure is roughly 14 psi at 1,000 feet in altitude versus roughly 3 psi at 35,000-40,000 feet when the towed aircraft 50 is released from tow and begins its pull-up versus roughly 1 psi at 60,000 ft or higher when the launch vehicle 70 is released from the towed aircraft 50 and air-launched—such that relatively larger payloads P may be air-launched and a relatively more gradual pull-up maneuver may be employed for lower g-loads, allowing for a relatively lighter and less structurally stiff glider 50 and/or launch vehicle 70 while also reducing the load or forces on the associated payload P and thus reducing the structural or mechanical requirements for the payload P as well. By way of illustration and not limitation, the maximum loading or G-forces on the overall air-launch assembly 100 as per the exemplary flight profile of FIG. 1 may be on the order of 2 to 3 G's versus 20 G's or higher as often seen in ground launch or other air-launch approaches that of necessity involve more extreme climbs or pull-up maneuvers for example. Those skilled in the art will appreciate that all such elevations or altitudes are merely illustrative and non-limiting, though in a preferred embodiment the air-launch assembly 100 of the towed aircraft 50 and launch vehicle 70 will gain more than 10,000 feet in elevation between the time the towed aircraft 50 is released from tow behind the tow aircraft 30 and the launch vehicle 70 is subsequently released from the towed aircraft 50, which further supports the effectiveness and increased efficiencies of a launch system according to aspects of the present invention. As shown in FIG. 4, the exemplary launch vehicle 70 is configured as a rocket having a main body 74 in two or more sections or stages joined by one or more interstage ring 76, with a forward axially-aligned nose cone 78 and rearward fins 80 and propulsion system 72, more about which is said below. As also best seen in FIG. 4, at all times from ground take-off and climb with the towed aircraft 50 under tow (FIG. 2) to towed aircraft 50 release (FIG. 3) to towed aircraft 50 pull-up and climb (FIG. 4), the launch vehicle 70 remains perched atop and adjacent to the towed aircraft 50, in this context "adjacent" meaning near, next to, or closely positioned to, without necessarily touching or being in contact; more particularly in the exemplary embodiment, the launch vehicle body 74 is partially seated within a lengthwise channel or trough 56 formed on or in the top surface of the glider body 54 (see also FIGS. 11-13), which those skilled in the art will 20) appreciate creates a relatively low-profile aerodynamic air-launch assembly 100 of the towed aircraft 50 and launch vehicle 70 so as to minimize adverse aerodynamic effects or drag during flight with the launch vehicle 70 in its stowed position adjacent to the glider or towed aircraft 50, thereby the air-launch assembly 100 effectively defining a single body in flight having a single flow field. It will be further appreciated that such trough 56 may be formed as part of the glider fuselage or body 54 itself or through separate fairings or the like positioned on the body 54. Further, the central axes 68, 88 of the respective towed aircraft 50 and launch vehicle 70 are substantially parallel in such stowed position of the launch vehicle 70 on the towed aircraft 50, with the launch vehicle 70 positioned above the towed aircraft wings 60, which are shown in the exemplary embodiment as being fixed and non-swept, and forwardly with the nose cone 78 of the launch vehicle 70 pointing in the same direction as and slightly set back from the nose 58 of the towed aircraft 50 and rearwardly with the lower fins 80 of the launch vehicle 70 straddling the body 54 and trough 56 of the towed aircraft 50 forward of the glider tail 62. Alternatively, even in the stowed position and with the orientation of the launch vehicle 70 and specifically its central axis 88 considered a zero angle of attack, the glider 50 instead of a zero angle of attack may have a slightly negative angle of attack relative to its zero lift line, in which case the glider's flight control surfaces may be deflected to take this as the new trim angle while some surfaces may be deployed to alter the zero lift angle of attack and to add drag. Again, the launch vehicle 70 remains in this stowed "low-profile" position on the glider or towed aircraft 50 until it is time for launch vehicle 70 release and air-launch.

Figure 5:
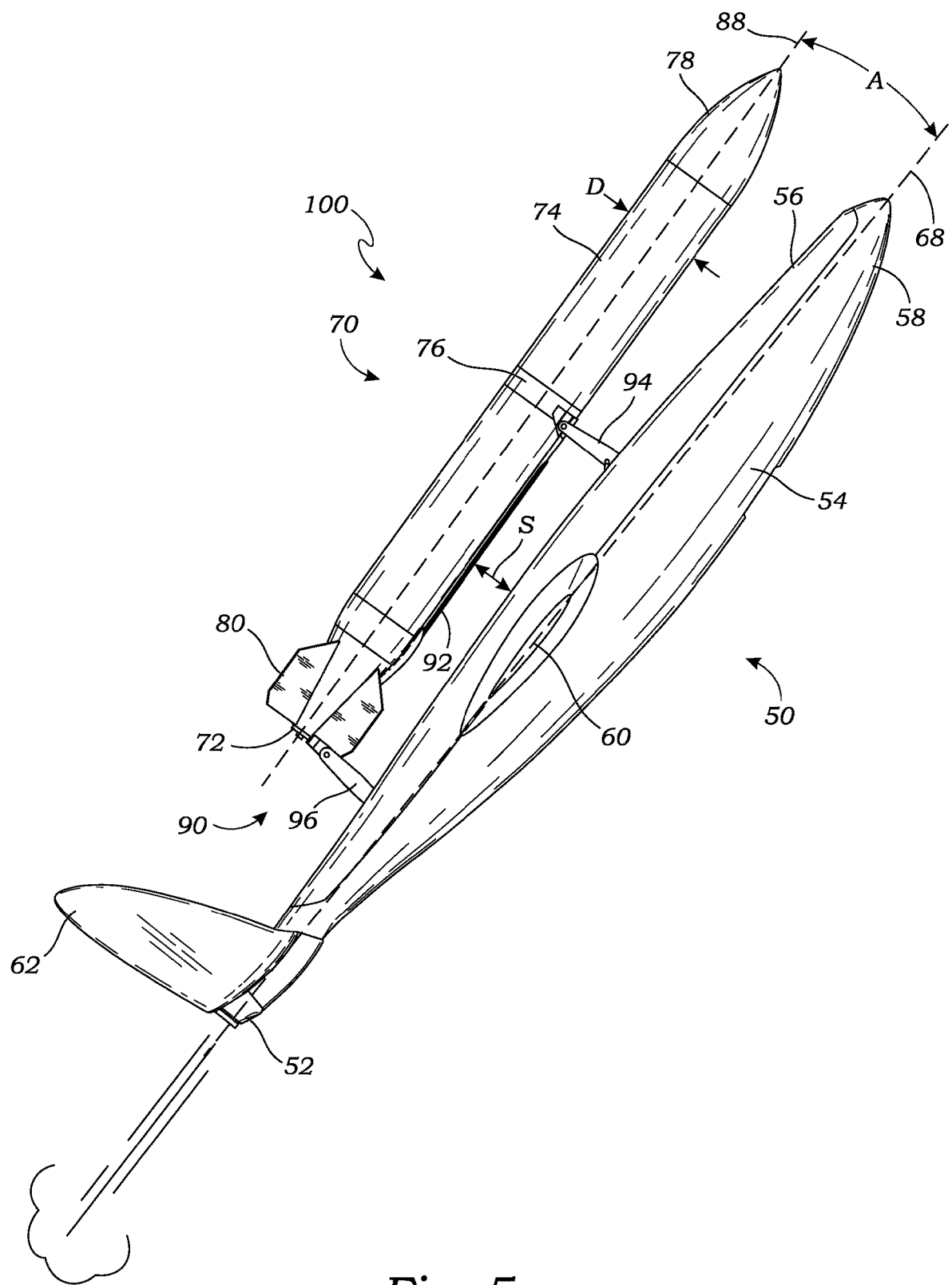
FIG. 5 is a schematic side view depicting the exemplary towed aircraft and launch vehicle of FIG. 4 now in a second operational mode, in accordance with at least one embodiment.

Turning to FIG. 5, with the glider's propulsion system 52 in operation and providing propulsion and the air-launch assembly 100 thus still gaining altitude and now nearing the point at which the launch vehicle 70 is to be released, the launch vehicle 70 is shifted from the stowed position of FIGS. 2-4 to a deployed position relative to the towed aircraft 50. It will be appreciated that such separation of the launch vehicle 70 from the glider or towed aircraft 50, and specifically the separation of the launch vehicle body 74 from the glider fuselage or body 54 as by shifting the launch vehicle body 74 out of the trough 56 formed in the glider body 54, serves to physically separate the launch vehicle 70 from the towed aircraft 50 while at least initially maintaining mechanical coupling therebetween through the deployment operation of the carriage 90 in order to separate the airflow between the coupled launch vehicle 70 and towed aircraft 50 and thereby minimize aerodynamic effects between the two objects upon launch vehicle 70 release. Those skilled in the art will appreciate that in so doing the fluid dynamics or flow field effects that would normally cause any such in-flight bodies to remain close or in contact and so can lead to unwanted re-contact or impingement between the towed aircraft 50 and the launch vehicle 70 after release are beneficially mitigated. Thus, by shifting the launch vehicle 70 and glider 50 physically apart and so allowing airflow therebetween, effectively two separate flow fields are formed, one about the glider 50 and one about the launch vehicle 70, so as to cause some degree of aerodynamic repelling rather than attractive force between the two bodies prior to or at the point of launch vehicle 70 release from the glider 50. There is thus provided a mechanism or system and method according to aspects of the present invention wherein to some extent flow field separation of the launch vehicle 70 from the glider or towed aircraft 50 is achieved for relatively safer in-flight separation of the two bodies prior to or at the point of decoupling and release of the launch vehicle 70. That is, it will be appreciated that release of the launch vehicle 70 from the glider 50 may occur substantially simultaneously with the carriage 90 and thus the launch vehicle 70 reaching the fully deployed position as shown in FIG. 5 or soon thereafter, more about which is said below. In any case, close coupling of bodies at the time of separation can cause aerodynamic attractive forces between the bodies, while separating the bodies provides a mitigating effect. In the exemplary embodiment, the minimum separation S of the launch vehicle body 74 from the glider body 54 when the launch vehicle 70 is in its fully-deployed state relative to the towed aircraft 50 is greater than or equal to one-quarter the diameter D of the launch vehicle body 74, which is represented by the following equation, with the separation S and diameter D indicated on FIG. 5 as well:

$$S \geq 0.25 \times D$$

Indeed, in some contexts it has been seen that at the moment of initial separation between two bodies in flight, such as with the coupled glider 50 and launch vehicle 70 here having a separation S of, for example, less than a tenth of the launch vehicle body diameter D (S<0.1×D), there may be an initial repulsion force between the bodies caused by a relative slowing of the air with a commensurate pressure increase, while then at roughly a tenth diameter D separation S (S=0.1×D), or slightly greater separation, there is a transitional fluid dynamics regime wherein there would be an attraction (aerodynamic low pressure or suction effect) between the bodies, or here between the glider 50 and the launch vehicle 70, whereby further separating the two bodies such as by at least a quarter of the launch vehicle body diameter D (S≥0.25×D) again reduces or mitigates against any aerodynamic attraction between the two bodies, which reduction in attraction increases as the separation S increases further (e.g., 0.5×D, 0.75×D, 1.0×D, etc.). While the launch vehicle body 74 is described as having a diameter D, which might assume that the launch vehicle body 74 is round or annular, those skilled in the art will appreciate that the launch vehicle body 74 may take other shapes, including but not limited to oval or hexagonal, such that the diameter D is to be understood as the greatest distance or dimension across the launch vehicle body 74 profile in a direction perpendicular to the launch vehicle central axis 88, irrespective of the cross-section or profile of the launch vehicle body 74. It is noted that such fluid dynamics or flow field effects and the beneficial separation thereof are realized both in subsonic flight and transonic and supersonic flight, particularly during Mach transition regimes, with aerodynamic effects simply being more unpredictable and enhanced at supersonic velocities. In the illustrated embodiment, the glider 50 and thus the air-launch assembly 100 may be traveling at approximately subsonic Mach 0.7 (roughly 500 mph) prior to release when the launch vehicle 70 is shifted from its stowed position of FIGS. 2-4 to its deployed position of FIG. 5 so as to physically separate the launch vehicle 70 and thus the internal payload P from the towed aircraft 50 at or prior to the point of decoupling the launch vehicle 70 and towed aircraft 50. Mechanically, such shiftable coupling between the towed aircraft 50 and the launch vehicle 70 is in the exemplary embodiment achieved via an articulatable carriage 90 operably installed therebetween, such carriage 90 having a rigid support 92 for seating against at least a portion of the launch vehicle body 74, the support 92 then supported pivotally at opposite ends by an at least one forward arm 94 and an at least one rearward arm 96, each of which it will be appreciated is a rigid connecting member or linkage to form such kinematic mechanism together with the support 92. It will thus be appreciated that when the forward and rearward arms 94, 96 are pivoted downwardly, and in the exemplary embodiment rearwardly, in a direction or into a position relatively more aligned with the axis 68 of the glider 50, the support 92 and thus the launch vehicle 70 are shifted downwardly and rearwardly likewise such that the support 92 along with a portion of the launch vehicle body 74 are located within the trough 56 formed in the glider body 54 as shown in FIGS. 2-4, which again is referred to as the stowed position of the launch vehicle 70 relative to the glider 50. And then when the launch vehicle 70 is to be shifted to its deployed position relative to the glider 20) 50 as shown in FIG. 5, in the exemplary embodiment, the forward and rearward arms 94, 96 of the carriage 90 are pivoted upwardly and forwardly in a direction or into a position relatively perpendicular to the axis 68 of the glider 50 so as to again shift the launch vehicle 70 out of the trough 56 and away from the glider 50, here to a position wherein the support 92 and thus the launch vehicle body 74 are separated by a separation S distance from the upper side of the glider fuselage or body 54. Those skilled in the art will thus appreciate that in the exemplary embodiment, the working lengths of the forward and rearward arms 94, 96, or the portions of the arms 94, 96 that extend above the glider body 54, effectively define the separation S between the glider 50 and the launch vehicle 70 in its deployed, pre-release state, such that the lengths of the arms 94, 96 are also at least one-quarter the diameter D of the launch vehicle body 74. Accordingly, it will be further appreciated that increasing or decreasing the lengths of the arms 94, 96 and/or their angular positions can adjust the separation S between the launch vehicle 70 and glider 50. Moreover, if the at least one forward arm 94 were relatively longer than the at least one rearward arm 96 and/or the at least one forward arm 94 was installed or configured to operate through a different angle than the at least one rearward arm 96 such that, for example, in the fully-deployed position of the launch vehicle 70 as shown in FIG. 5 the at least one forward arm 94 was oriented relatively vertically or relatively more perpendicular to the glider body central axis 68 than the at least one rearward arm 96, it would follow that the front of the carriage support 92 and thus the nose 78 of the launch vehicle 70 would be slightly higher relative to the glider body 50 than the rear of the carriage support 92 and thus the back end or fins 80 of the launch vehicle 70, whereby the fundamental result is that the launch vehicle 70 in its deployed and released state is somewhat pitched up relative to the glider 50 such that the central axis 88 of the launch vehicle 70 is elevated or at an angle A relative to the central axis 68 of the glider 50. More precisely in particular contexts (aerodynamic scenarios and/or air-launch assembly 100 configurations wherein the launch vehicle 70 weighs more than the glider 50), it can be said that the angle of attack of the launch vehicle 70 is effectively at all times zero, as represented by the launch vehicle central axis 88, such that the angle of attack of the glider 50, as represented by the glider central axis 68, is effectively shifted negative or is reduced relative to the angle of attack of the launch vehicle 70. It will be appreciated that such angle of attack effects translate to the glider 50 ranging from zero lift to negative lift during this portion of the flight sequence, with the transition to negative lift of the glider 50 at the point of the launch vehicle 70 shifting to its deployed position serving to further diverge the respective flight paths of the launch vehicle 70 and glider 50 upon launch vehicle 70 decoupling or separation. Those skilled in the art will appreciate that it is advantageous to position or orient the launch vehicle 70 for separation and subsequent release from the carriage 90 and thus the glider 50 with a relative difference in angle of attack therebetween of even a degree or two to further facilitate beneficial aerodynamic effects and thereby assist with launch vehicle 70 separation from the carriage 90 and glider 50. In an exemplary embodiment, the angle A between the launch vehicle 70 in its deployed position relative to the glider or towed aircraft 50 is in the range of one to ten degrees (1-10°) or more preferably in the range of one to five degrees (1-5°), though it will be appreciated that other angles of attack are possible even above ten degrees (10°), to whatever extent appropriate or feasible for a particular air-launch assembly 100 configuration so as to encourage flight path divergence between the launch vehicle 70 and glider 50 upon release while not introducing any tendency in the launch vehicle 70 that could result in it departing from the desired flight path angle or possible recontacting the glider 50 after release. In this way, the carriage 90 serves to pre-position the launch vehicle 70 for desired or optimal orientation relative to the glider 50 at or prior to the point of release, with the carriage 90 and particularly the support 92 further providing axial, lateral, and rotational stability to the launch vehicle 70 during flight, both in the stowed position atop the towed aircraft 50 and throughout the launch vehicle 70 deployment process as the launch vehicle 70 is extended away from the towed aircraft 50 and released, or again, the glider or towed aircraft 50 may effectively be pushed away from the launch vehicle 70 and to a negative angle of attack upon actuation of the carriage 90. The carriage support 92 and/or arms 94, 96 may be selectively coupled to the launch vehicle body 74 employing any appropriate bolts, pins, or other such structures whether now known or later developed; similarly, the ends of the arms 94, 96 opposite the support 92 may also be selectively coupled to the glider body 54, and particularly within the trough 56 formed therein, again employing any appropriate bolts, pins, or other such structures whether now known or later developed. Furthermore, the carriage 90 and particularly articulation or movement of the arms 94, 96 may be achieved using any appropriate power and control mechanism, component, assembly, or system whether now known or later developed, including but not limited to one or more hydraulic cylinders or mechanical springs. More generally, it will be appreciated that while a particular carriage 90 configuration is shown and described, the launch system 20 according to aspects of the present invention, including the air-launch assembly 100 as including the glider or towed aircraft 50 and the launch vehicle 70 and now the carriage 90 as selectively coupling and shifting the launch vehicle 70 and glider 50 relative to each other, may take a virtually infinite number of forms and so may entail a variety of geometries, materials, assembly fasteners, and other such structures and related actuation and control devices whether now known or later developed without departing from the spirit and scope of the invention, such that the configurations shown and described are to be understood as merely illustrative of aspects of the present invention and non-limiting. By way of further illustration and not limitation, it is again noted that while a "top-carry" arrangement of the launch vehicle 70 on the glider or towed aircraft 50 is shown and described, including the incorporation of the carriage 90 for selectively coupling and articulating the launch vehicle 70 relative to the towed aircraft 50, which arrangement has attendant benefits at the point of launch vehicle 70 release as described above and further below, the invention is not so limited, and any such "bottom-carry" arrangement may likewise be employed as again involving a carriage 90 for supporting and coupling and selectively shifting the launch vehicle 70 relative to the towed aircraft 50 from a stowed to a deployed position in order to advantageously achieve aerodynamic and orientation benefits in-flight prior to or at the point of release of the launch vehicle 70. Fundamentally, the deployment and release of the launch vehicle 70 is not initiated until the air-launch assembly 100 has reached the desired altitude and orbital inclination angle, with the process or mechanism for deploying and releasing the launch vehicle 70 from the glider 50 configured so as to essentially maintain the launch vehicle 70 at the desired orbital inclination angle at and through release.

Figure 6:
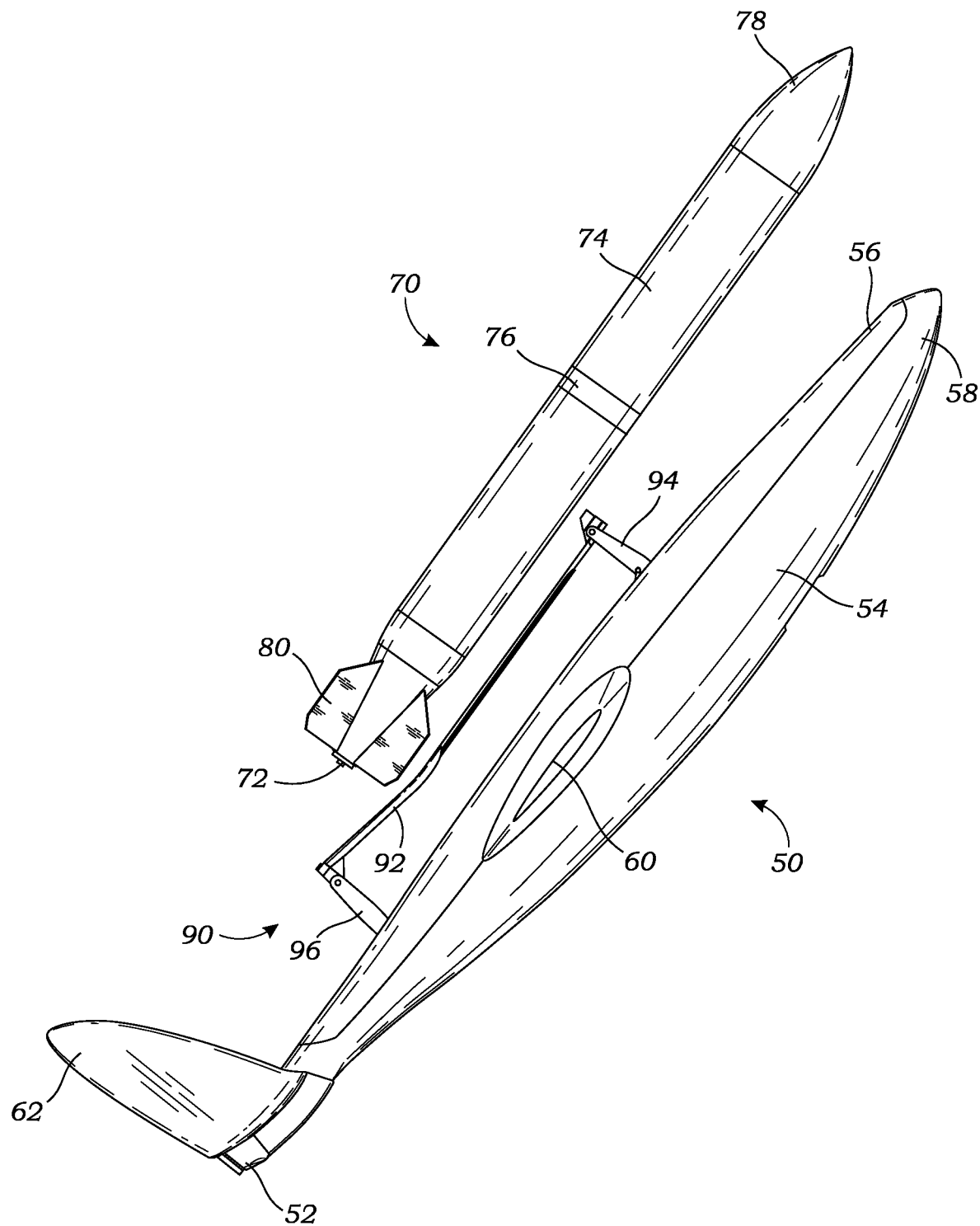
FIG. 6 is a schematic side view depicting the exemplary towed aircraft and launch vehicle of FIG. 4 now in a third operational mode, in accordance with at least one embodiment.
Figure 7:
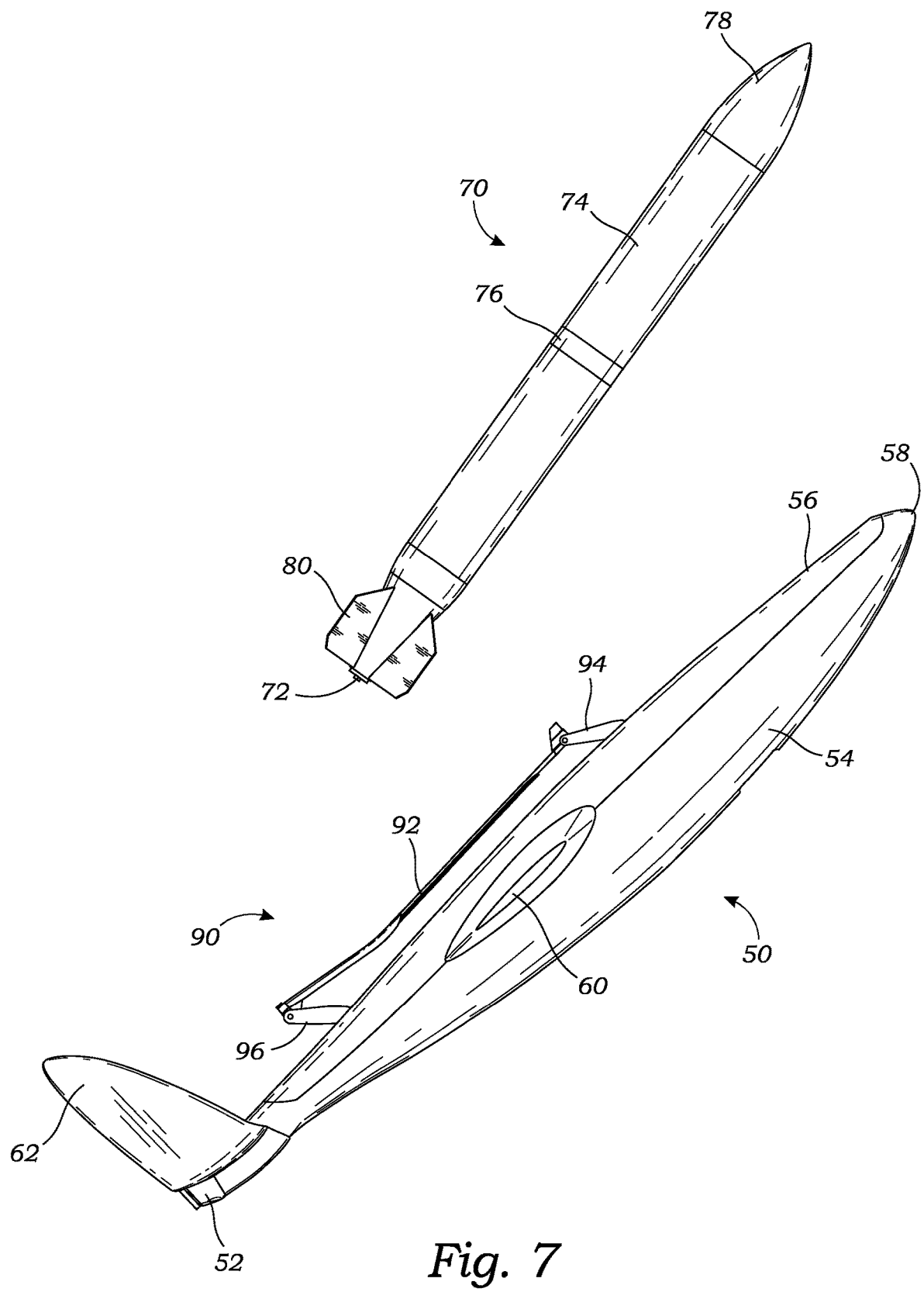
FIG. 7 is a schematic side view depicting the exemplary towed aircraft and launch vehicle of FIG. 4 now in a fourth operational mode, in accordance with at least one embodiment.
Figure 8:
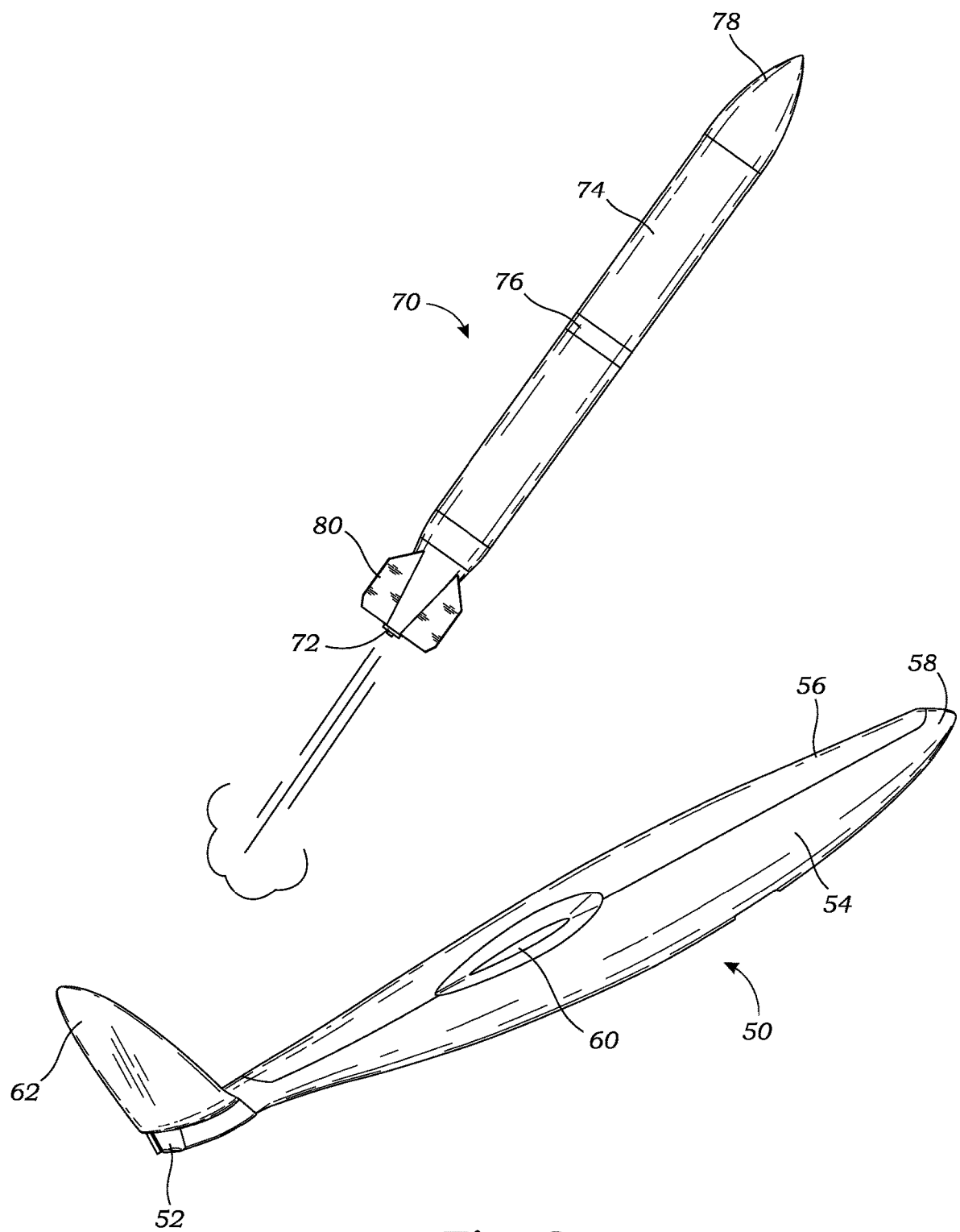
FIG. 8 is a schematic side view depicting the exemplary towed aircraft and launch vehicle of FIG. 4 now in a fifth operational mode, in accordance with at least one embodiment.

Referring next to FIGS. 6-8 in conjunction still with the overall flight profile of FIG. 1, there are shown sequential positions of the launch vehicle 70 relative to the glider or towed aircraft 50 after the launch vehicle 70 has been released. First, as shown in FIG. 6, in the exemplary embodiment, the glider propulsion system 52 is shut off just at or prior to launch vehicle 70 release, such shut-off even optionally triggering launch vehicle 70 deployment via operation of the carriage 90, such that at the point of release or when the launch vehicle 70 is just decoupled from the carriage 90 that is still operably installed on the glider 50, and based on the aerodynamic effects described above in connection with FIG. 5 illustrating the launch vehicle 70 relative to and spaced from the glider 50 in its deployed position based on operation of the carriage 90 as well as any inherent angle of attack inclination of the launch vehicle 70 relative to the glider 50 or negative angle of attack of the glider 50 relative to the launch vehicle 70, the glider 50 and the launch vehicle 70 may thus begin to shift apart or have their flight paths begin to diverge at the moment of launch vehicle 70 release. However, it will be appreciated that in some contexts the glider propulsion system 52 may remain operational even at or during launch vehicle 70 deployment and release, in either case the aerodynamic effects and benefits as herein described being realized. Moreover, and in either case (powered or unpowered glider 50), it will be appreciated that the mechanical activation and movement of the carriage 90 as applying or exerting forces on or against the two bodies 50, 70 can effectively impart velocity to the launch vehicle 70, as if the launch vehicle 70 were being thrown by the glider 50 via the carriage 90, or to the glider 50, as if the glider 50 were being pushed away from the launch vehicle 70 via the carriage 90, such velocity differential between the glider 50 and the launch vehicle 70 thereby further assisting with the relatively immediate separation and flight path divergence of the glider 50 and launch vehicle 70 when the launch vehicle 70 is released at the point of, or just prior to or just after, the carriage 90 reaching the deployed position. Once more, the mechanical coupling and subsequent decoupling or release of the launch vehicle 70 from the carriage 90 may be through any appropriate bolts, pins, or other such structures, exploding or otherwise actuatable or releasable, whether now known or later developed; in any case, in an exemplary embodiment actuation of the carriage 90 at the point of commencing or completing deployment triggers release of the attachment point(s) to decouple the two bodies (decouple the launch vehicle 70 from the glider 50 via the carriage 90). As shown in FIG. 6 and also in FIG. 7, as the flight paths of the launch vehicle 70 and the towed aircraft 50 continue to diverge in the seconds following launch vehicle 70 release, the glider propulsion system 52 remains off and the launch vehicle propulsion system 72 has not yet activated with the two vehicles still in relative proximity. By way of illustration and not limitation, the launch vehicle propulsion system 72 may be activated within approximately the first five (5) seconds after separation from the glider 50, based on a number of distance and direction and velocity factors and under control system operation or otherwise so as to ensure that the propulsive effect of the launch vehicle propulsion system 72 does not impinge on or adversely affect the glider 50. Not shown, and certainly possible as is known in the art, the launch vehicle 70 in the form of a rocket with liquid propellant may have a propellant settling rocket (e.g., 0.5 G of thrust) that is ignited prior to and distinct from the main launch vehicle propulsion system 72 activation. Alternatively, any other system or means for settling any liquid propellant or providing positive pressure to or otherwise encouraging such liquid propellant in the launch vehicle propulsion system 72 toward, against, or into the engine injector (not shown), such as a pump and whether now known or later developed, may be employed in the launch vehicle 70 according to aspects of the present invention. Soon or substantially immediately after or even substantially simultaneous with the release of the launch vehicle 70 from the glider carriage 90, the glider 50 will start to nose down or level off and ultimately begin its descent through a sort of bunting or bunt-over or negative lift maneuver, again, under the control of one or more spoiler, flap, aileron, elevator, or other such adjustable surface or structure on a wing 60 and/or tail 62 of the glider 50. It will be appreciated that such a bunting or bunt-over maneuver of the towed aircraft 50 relative to the released launch vehicle 70 is beneficially applied here to further contribute to separation of the two vehicles or divergence of their flight paths without the glider 50 having to perform a more complicated roll, and initially without yet or necessarily powering either the glider 50 or the launch vehicle 70. More generally, it will be appreciated that the glider 50 flight path is commanded aerodynamically while the launch vehicle 70 flight path is substantially ballistic with aerodynamic drag offset by settling or main thrust. With reference to FIG. 8, the glider or towed aircraft 50 has nosed down or leveled off further and so diverged still further from the launch vehicle 70, at which point the launch vehicle propulsion system 72 is shown as activated. However, it will be appreciated by those skilled in the art that the launch vehicle propulsion system 72 can be ignited or activated earlier in the sequence, and in some cases even while the launch vehicle 70 is still in its stowed position on the glider 50 or just prior to initiating the deployment and release or air-launch of the launch vehicle 70 from the glider 50, depending on a number of factors and mission parameters, including altitude and angle of inclination and whether orbital or suborbital payload P delivery. Relatedly, those skilled in the art will appreciate that ignition of the primary launch vehicle propulsion system 72 will most likely not be instantaneous, instead there being a "start regime" and "thrust curve" having some degree of lag time associated with the propulsion system 72, such that initiation of the launch or ignition sequence of the propulsion system 72 may begin prior to launch vehicle 70 release, including actuation of the carriage 90 to shift the launch vehicle 70 from its stowed position to its deployed position relative to the glider 50, with the launch or ignition sequence then not being concluded with the propulsion system 72 fully firing until some time after launch vehicle 70 release from the glider 50, and the carriage 90 specifically, as shown sequentially in FIGS. 6-8. As such, while the launch vehicle propulsion system 72 is not illustrated as operational until FIG. 8, those skilled in the art will appreciate that such could be earlier or later in the sequence, again, all such figures being schematic in nature and not to be taken literally or to scale in any respect, instead being illustrative of aspects of the present invention and non-limiting. Hence, the launch vehicle 70 is "air-launched," or launched in the air at altitude rather than from the ground, as facilitated by the tow-launched aircraft 50 as herein described. Notably, as seen in the sequence of FIGS. 6-8, as the glider or towed aircraft 50 falls away and begins to level off, the launch vehicle 70 substantially maintains its desired, increased flight path angle as now the launch vehicle propulsion system 72 is activated, propelling the launch vehicle 70 to still greater altitude as represented in the flight profile diagram of FIG. 1 until the desired orbital location (altitude and inclination) or suborbital destination is reached and the payload P such as a satellite is launched into orbit or suborbital trajectory via one or more stages of the launch vehicle 70. It will be appreciated that a variety of such payload items and desired orbital or suborbital deployments are possible employing a launch system according to aspects of the present invention, such that once again the exemplary flight profile of FIG. 1 and related "snap shots" of FIGS. 2-8 are to be understood as merely illustrative of aspects of the present invention and non-limiting and are not to be taken literally or to scale. As will also be appreciated from FIG. 8, as compared with FIGS. 6 and 7 illustrating the moments immediately after release of the launch vehicle 70, once the launch vehicle 70 is a safe distance away from the glider 50, the carriage 90 may be shifted from its deployed position back to a stowed position, here to the point that the entire carriage 90 is housed within the trough 56 formed in the glider body 54 and so is no longer visible at least from the side, which it will be appreciated would reduce drag and the possibility of impingement or other damage. Though stowing of the carriage 90 is illustrated in the same FIG. 8 "snap shot" as activation of the launch vehicle propulsion system 72, those skilled in the art will appreciate that such can occur before or after such ignition of the launch vehicle propulsion system 72 and particularly that stowing the carriage 90 can be initiated immediately after launch vehicle 70 release therefrom, as illustrated in at least FIG. 7 showing the carriage 90 partially stowed or shifting from and somewhere between its fully deployed position and its fully stowed position, based on a number of factors. It will also be appreciated that depending on the geometry of both the carriage 90 and the glider body trough 56 and other factors related to the carriage 90 articulation, even when fully stowed a portion of the carriage 90 may still be exposed or visible outside of the glider body 54. The configuration and performance characteristics of the launch vehicle propulsion system 72 may vary to suit particular applications and ultimately may involve any such technology whether now known or later developed, and thus the qualities or characteristics of any such launch vehicle propulsion system 72 may be adjusted or optimized as appropriate or desired, including but not limited to vacuum level performance, specific impulse, and nozzle geometry, all as individually or collectively affecting the thrust and efficiency of the propulsion system 72. Similarly, the glider propulsion system 52 may be any appropriate propulsion system now known or later developed that is preferably throttleable and restartable to facilitate take-off assist during the launch sequence or flight profile as described above in connection with FIG. 2, pull-up and climb in the intermediate launch sequence as described above in connection with FIGS. 3-5, and glider recovery late in the flight profile after the launch vehicle 70 has been released and the glider 50 is on its return flight for landing and provisioning for subsequent missions. By way of further illustration and not limitation, activation of the glider propulsion system 52 at an altitude of on the order of 40,000 feet provides approximately a twenty percent (20%) improvement in specific impulse ($I_{sp}$) over sea level operation, and operation of the launch vehicle propulsion system 72 at an altitude of on the order of 60,000 feet provides approximately a thirty percent (30%) improvement in specific impulse ($I_{sp}$) over sea level operation. Moreover, if the length of the particular propulsion system nozzle is extended, further propulsion system performance or efficiency improvements may be realized, less so for the glider propulsion system 52 still operating within the atmosphere at, for example, 40,000 to 60,000 feet and moreso for the launch vehicle propulsion system 72 generally operating above 60,000 feet and thus at a reduced atmosphere. Ultimately, operation at altitude results in more thrust for the same propellant mass flow as compared to lower altitude operation, in part due to the ability to extend the nozzle. Generally, there is thus shown in the sequence of FIGS. 4-8 more detailed "snap shots" of the exemplary operation and positions of the glider or towed aircraft 50 and launch vehicle 70 and related assembly carriage 90 as corresponding to the first two "frames" of FIG. 1 showing the air-launch assembly 100 in progression upon pull-up and launch vehicle 70 release, as indicated by the dashed circle in FIG. 1 labeled "FIGS. 4-8" for reference. And the overall flight profile of FIG. 1 as representative of a launch system 20 according to aspects of the present invention thus entails a safe separation maneuver involving both deployment of a launch vehicle 70, or shifting from a stowed position to a deployed position, without yet being decoupled or prior to its release from a glider 50, even including an increased angle of attack of the launch vehicle 70 relative to the glider 50 in its pre-release deployed state, as well as a "bunting" or "bunt-over" maneuver of the glider 50 after release of the launch vehicle 70 to further ensure glider 50 and launch vehicle 70 separation and flight path divergence for safe and effective air-launch of a launch vehicle 70 and its payload P even in an advantageous top-carry arrangement on a glider 50. These and other advantages in construction and use of such a launch system 20 and method according to aspects of the present invention will be appreciated by those skilled in the art. By way of further illustration and not limitation, control system automation of various portions of the flight profile or launch sequence illustrated in FIGS. 1-8 may be employed, including but not limited to an integrated control system coupling the carriage 90 and related launch vehicle 70 release mechanism (not shown) with the launch vehicle 70 ignition system or propulsion system 72 as in the case of the separation of the launch vehicle 70 from the towed aircraft or glider 50 and subsequent ignition of propellant settling rocket(s), or operation of any other propellant settling system, device, or approach, and/or of the launch vehicle propulsion system 72 or propulsion system activation sequence.

Figure 9:
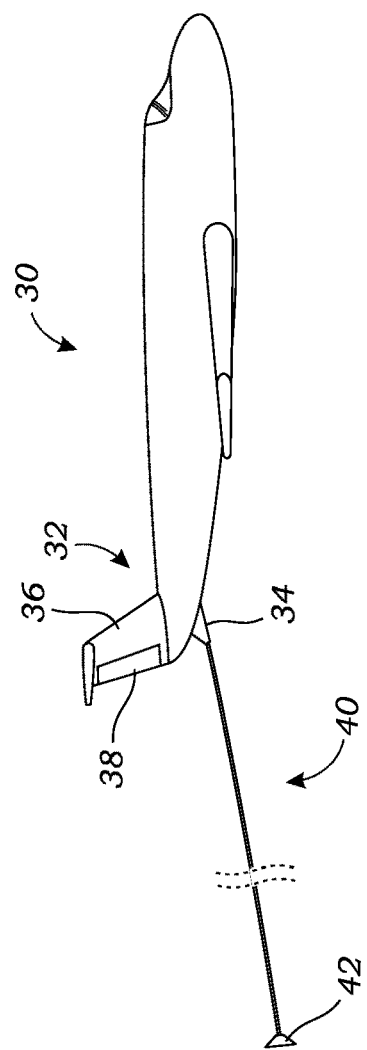
FIG. 9 is a schematic side view depicting the exemplary towed aircraft and launch vehicle of FIG. 2 no longer in tow behind the tow aircraft, in accordance with at least one embodiment.
Figure 9:
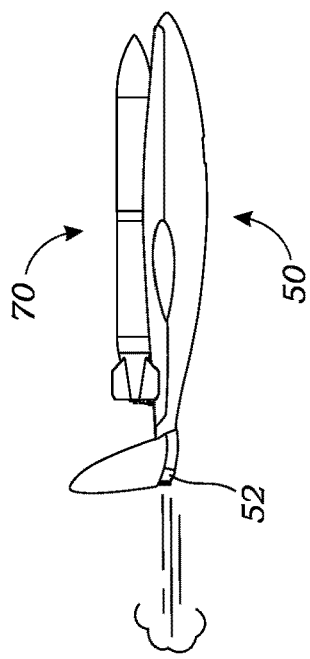

Referring briefly to FIG. 9, there is shown a schematic side view depicting the exemplary glider or towed aircraft 50 and launch vehicle 70 of FIG. 2 no longer in tow behind the tow aircraft 30. Unlike the intended release from tow of the glider 50 when towed to the desired altitude for the glider 50 to then initiate a pull-up and climb maneuver as shown and described in connection with FIG. 3 and following, here there is illustrated a circumstance wherein the tow-launch sequence is aborted, whether due to tow cable 40 failure, issues with the tow aircraft 30 or the towed aircraft 50 and related launch vehicle 70, or otherwise, in which case it is desired that the glider or towed aircraft 50 be able to fly under its own power so as to perform a turn-around or "go around," including gaining or maintaining whatever altitude and speed are necessary, so as to re-land on the same runway or strip from which the glider 50 with launch vehicle 70 first took off under tow or otherwise, in any event it being appreciated that the glider propulsion system 52 already being activated for take-off assist as discussed above in connection with FIG. 2 or being able to be started or ignited (or restarted) as needed in an abortment situation facilitates such a turn-around and re-landing and recovery of the glider 50 thus providing further advantages in safety and effectiveness in use or significant safety risk mitigation. Of course, those skilled in the art will appreciate that such a throttleable and restartable glider propulsion system 52 is also advantageous on the back end of a successful mission or launch sequence in allowing the glider 50 to redirect or return to a desired runway or strip from relatively farther distances, thereby improving the range and mission capability of the overall launch system 20.

Figure 10:
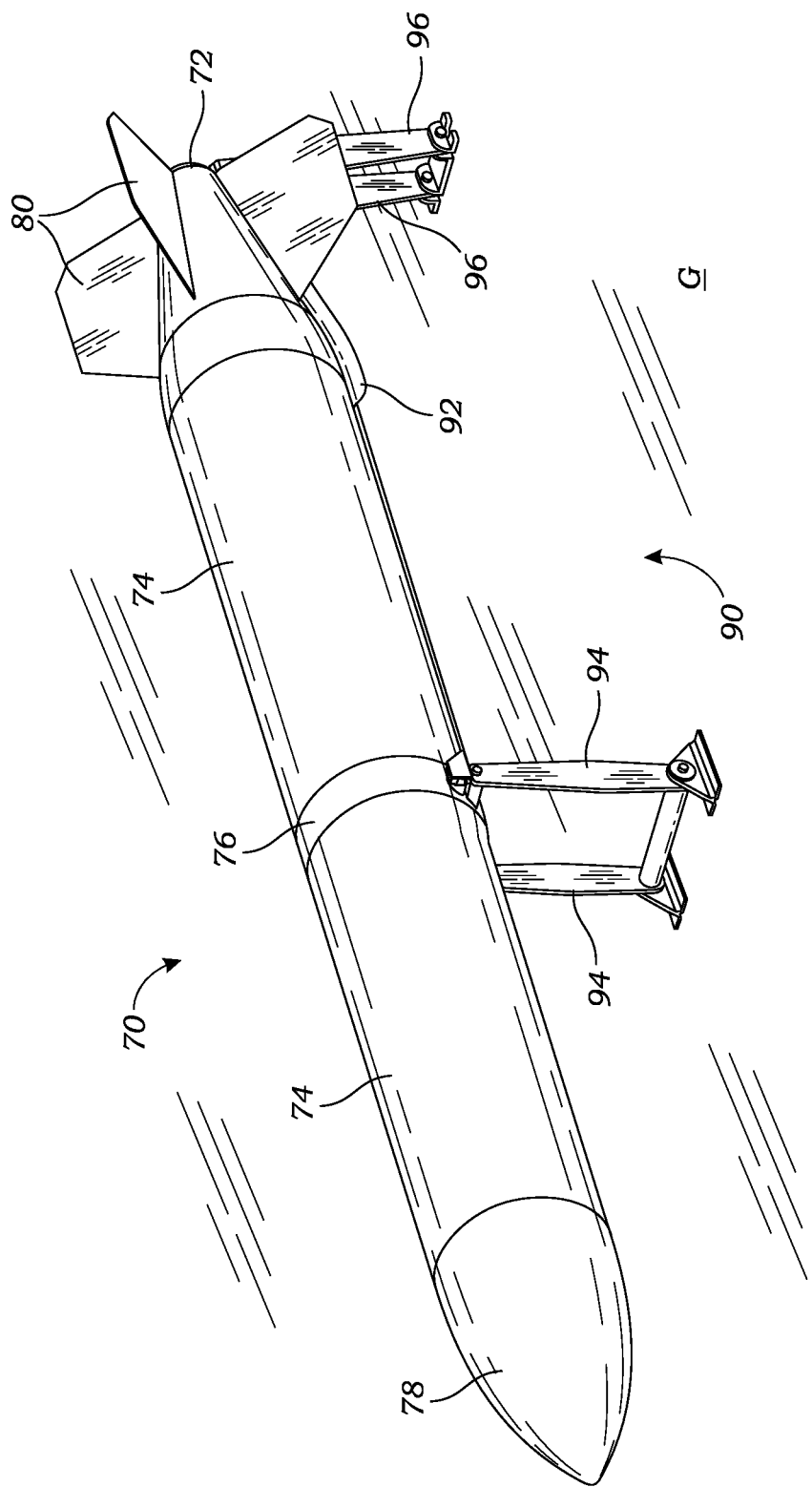
FIG. 10 is an enlarged schematic perspective view depicting the exemplary launch vehicle of FIGS. 1-9 removed from the towed aircraft, in accordance with at least one embodiment.
Figure 11:
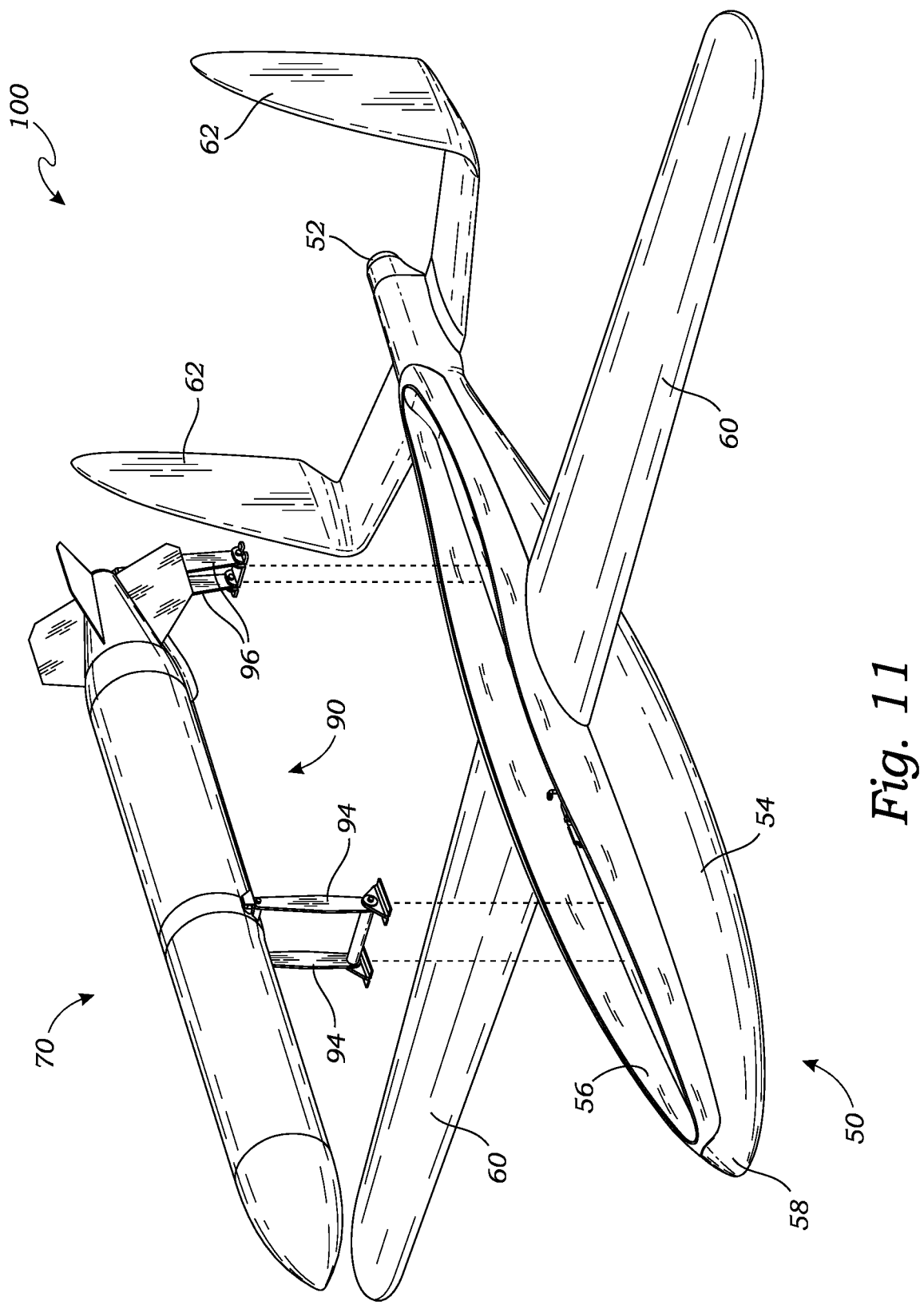
FIG. 11 is a reduced-scale schematic exploded perspective view depicting the exemplary launch vehicle of FIG. 10 being installed in the towed aircraft, in accordance with at least one embodiment.
Figure 12:
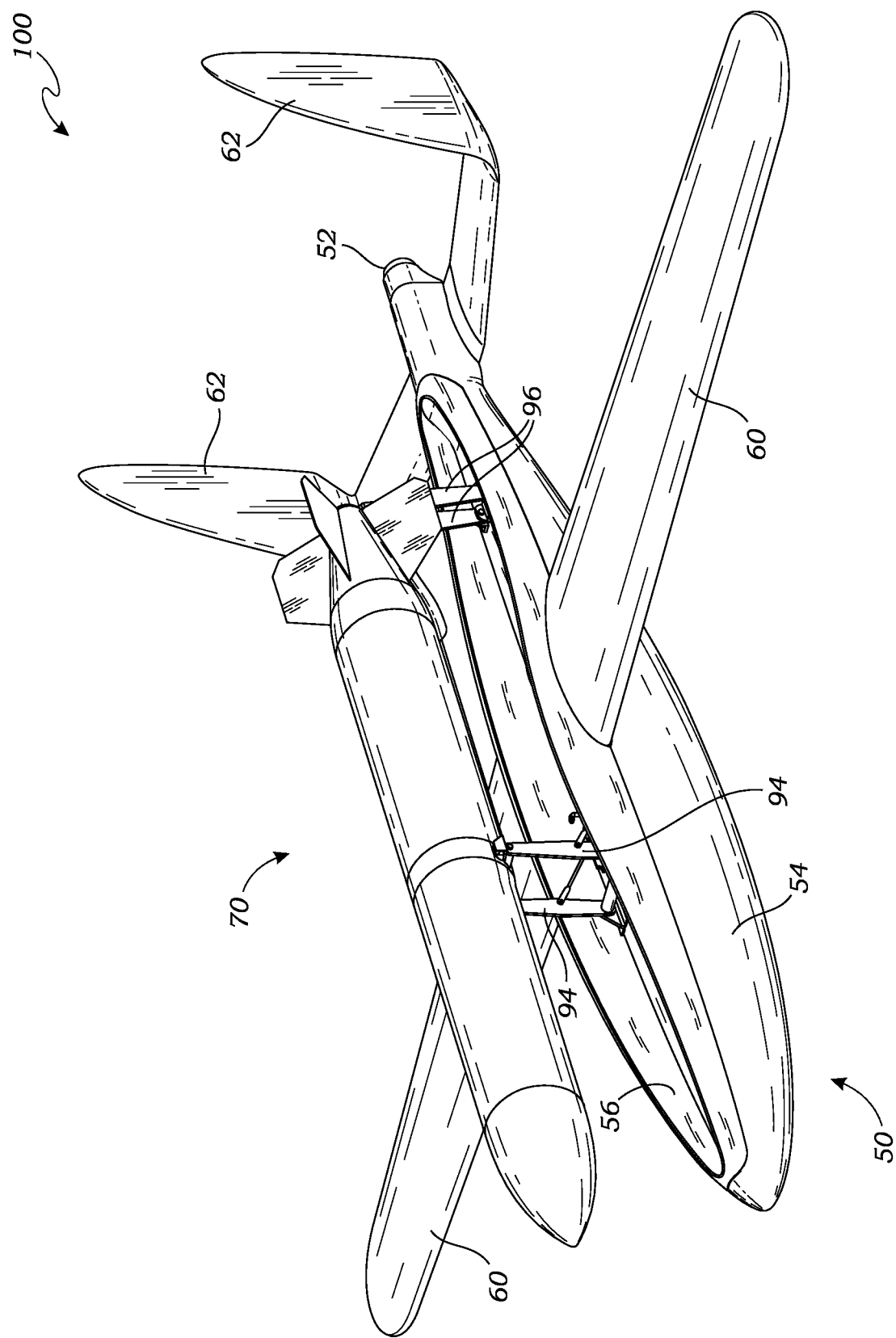
FIG. 12 is a schematic perspective view thereof depicting the exemplary launch vehicle installed in the towed aircraft in a first position, in accordance with at least one embodiment.
Figure 13:
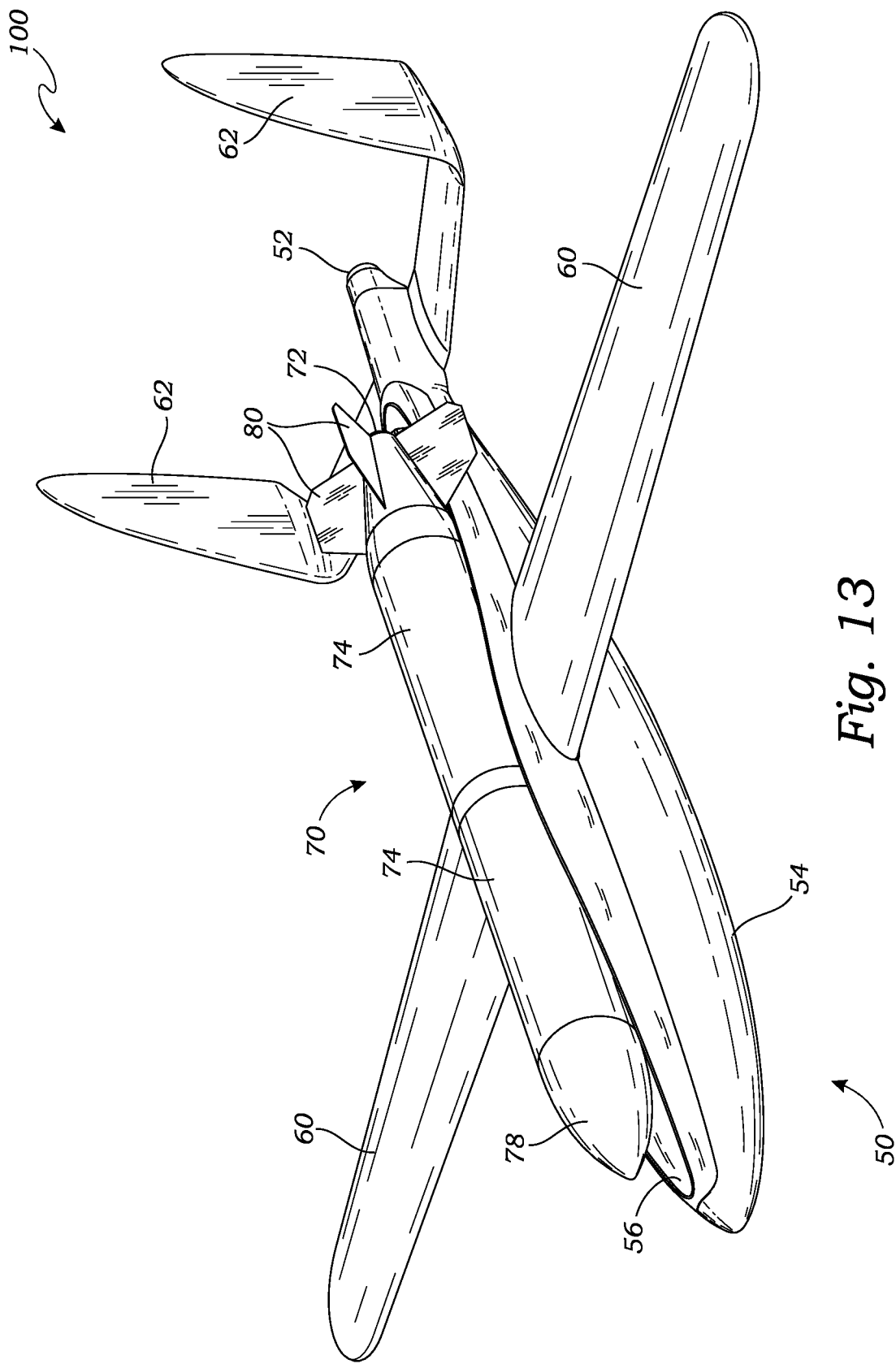
FIG. 13 is a schematic perspective view thereof depicting the exemplary launch vehicle installed in the towed aircraft in a second position, in accordance with at least one embodiment.

Finally, with reference to FIGS. 10-13, there are shown perspective views of the glider or towed aircraft 50, the launch vehicle 70, and/or the carriage 90 for selectively assembling the launch vehicle 70 on the glider 50. First, in FIG. 10, there is shown a perspective view of the exemplary launch vehicle 70 as assembled on the carriage 90 that is at this point situated on the ground G or other surface outside of the glider 50 (FIGS. 11-13). Those skilled in the art will appreciate that the use of the carriage 90 in this fashion and its support 92 that interconnects the forward and rearward arms 94, 96 forms a workbench of sorts and a means for stabilizing and supporting even the construction or assembly of the launch vehicle 70 and the installation of any payload P (FIG. 1) within the launch vehicle body 74 via the nose cone 78, for example. Relatedly, it will be appreciated that with the one or more forward arms 94 coupled to the interstage ring 76 of the launch vehicle 70 and the one or more rearward arms 96 coupled to the rear end of the launch vehicle 70 in the vicinity of the propulsion system 72 and fins 80, the first stage of the launch vehicle 70 and its attendant weight can be managed on the carriage 90 as supported somewhat centrally or in a balanced way on the carriage support 92 and opposite arms 94, 96. Subsequently, the forward second stage section of the launch vehicle overall body 74 can be assembled along with the nose cone 78, with at any point any temporary support, hoist, or lifting means or rail transfer, for example, being employed as needed. Those skilled in the art will once again appreciate that the figures are schematic in nature and not to be taken literally or to scale, here specifically in connection with the number and relative sizes of the stages of the launch vehicle 70, which can vary significantly depending on a number of mission-specific factors. Once the launch vehicle 70 is so assembled on the carriage 90 as shown in FIG. 10, such launch vehicle 70 and carriage 90 assembly may be operably installed on the glider or towed aircraft 50 as illustrated in FIGS. 11 and 12 to form the overall air-launch assembly 100 that is to be tow-launched or towed behind a tow aircraft 30 (FIGS. 1-3), in the exemplary embodiment with the opposite arms 94, 96 being installed within the trough 56 formed in the upper surface of the glider fuselage or body 54 employing any appropriate assembly means now known or later developed. With the launch vehicle 70 and carriage 90 so installed on the glider 50 initially in the deployed position with the carriage arms 94, 96 extended as shown in FIG. 12, in a final pre-launch or pre-flight step or to position the launch vehicle 70 for take-off and flight, the carriage 90 and thus the launch vehicle 70 is shifted from its deployed position to its stowed position on the glider 50 as shown in FIG. 13. Once again, those skilled in the art will appreciate that a carriage 90 according to aspects of the present invention thus facilitates pre-flight assembly, transportation, and maintenance of the launch vehicle 70 with strongback support 92 and related support arms 94, 96 for assembly of the launch vehicle 70 and any payload P prior to engagement with the glider 50. It will be further appreciated once more that a variety of other configurations of such carriage 90 are possible according to aspects of the present invention without departing from its spirit and scope, in large part depending on the configurations of the glider 50 and launch vehicle 70.

In summary, there is provided in a launch system 20 according to aspects of the present invention a powered glider 50 with separate launch vehicle 70 together towed to altitude by a tow aircraft 30, and more particularly a system and method wherein the launch vehicle 70 is shifted from a stowed position to a deployed position on the powered glider 50 for aerodynamic benefits during flight and right up to the point the launch vehicle 70 is actually released for air-launch, which provides numerous advantages in use. Further, by providing a powered glider 50, and specifically a throttleable and restartable glider propulsion system 52, there is provided or enabled take-off assist to the tow aircraft 30, power for glider 50 pull-up and climb upon release from tow, and selective power for glider 50 recovery after release and air-launch of the launch vehicle 70. And in the exemplary top-carry arrangement, a bunting or bunt-over maneuver of the glider 50 after launch vehicle 70 release contributes to safe and effective separation, as again further facilitated by the pre-release separation of the launch vehicle 70 from the glider 50 for reduced adverse aerodynamic effects and in the top-carry context even orienting the glider 50 at a decreased or negative angle of attack in the deployed position relative to the launch vehicle 70 to further encourage the divergence of the glider 50 and launch vehicle 70 flight paths upon launch vehicle 70 release. These and other advantages will be appreciated from the present non-limiting disclosure. Those skilled in the art will appreciate that a variety of aircraft and related systems and corresponding methods and launch sequences or flight profiles are possible according to aspects of the present invention without departing from its spirit and scope, such that the exemplary embodiments shown and described herein are to be understood as illustrative and non-limiting.

Aspects of the present specification may also be described as the following exemplary embodiments:

Embodiment 1. A launch system for orbital or suborbital air-launch of a payload, the system comprising: a tow aircraft; a towed aircraft selectively in tow behind the tow aircraft at take-off and in flight via an interconnected tow cable, the towed aircraft having a towed aircraft body defining a towed aircraft central axis and being selectively powered as by having a throttleable and restartable towed aircraft propulsion system installed on or within the towed aircraft to perform a pull-up and climb upon release of the towed aircraft from tow at a desired first altitude; a launch vehicle releasably carried on the towed aircraft, the launch vehicle having a launch vehicle body defining a launch vehicle diameter and a launch vehicle central axis and being selectively powered as by having a launch vehicle propulsion system installed on or within the launch vehicle for propulsion upon release of the launch vehicle from the towed aircraft at a desired second altitude; and an articulatable carriage releasably coupling the launch vehicle with the towed aircraft, the towed aircraft, launch vehicle, and articulatable carriage together defining an air-launch assembly, the articulatable carriage configured for selectively shifting the launch vehicle between a stowed position adjacent to the towed aircraft and a deployed position spaced from the towed aircraft, thereby allowing for reduced drag with the launch vehicle in the stowed position during tow and during pull-up and climb after release from tow and further allowing for reduced adverse aerodynamic effects between the towed aircraft and the launch vehicle with the launch vehicle in the deployed position at release of the launch vehicle from the towed aircraft, whereby upon release of the launch vehicle from the towed aircraft the towed aircraft flight path diverges from the launch vehicle flight path and the launch vehicle propulsion system is activated to air-launch the launch vehicle and deliver the payload to higher altitude.

Embodiment 2. The system of embodiment 1 wherein in the deployed position of the air-launch assembly the spacing of the launch vehicle body from the towed aircraft body is a distance of approximately one-quarter or more of the launch vehicle diameter.

Embodiment 3. The system of embodiment 1 or embodiment 2 wherein in the deployed position of the air-launch assembly the launch vehicle central axis is at an inclined angle relative to the towed aircraft central axis, whereby in the deployed position the towed aircraft has a negative angle of attack relative to the launch vehicle.

Embodiment 4. The system of embodiment 3 wherein the negative angle of attack is in the range of one to ten degrees (1-10°).

Embodiment 5. The system of any of embodiments 1-4 wherein the launch vehicle in the deployed position of the air-launch assembly is forward relative to the launch vehicle in the stowed position of the air-launch assembly.

Embodiment 6. The system of any of embodiments 1-5 wherein in the stowed position of the air-launch assembly the launch vehicle central axis and the towed aircraft central axis are substantially parallel.

Embodiment 7. The system of any of embodiments 1-6 wherein in the stowed position of the air-launch assembly a nose cone of the launch vehicle is rearward of a nose of the towed aircraft.

Embodiment 8. The system of any of embodiments 1-7 wherein a lengthwise trough is formed on the towed aircraft body.

Embodiment 9. The system of embodiment 8 wherein the articulatable carriage is installed in the trough such that in the stowed position of the air-launch assembly the launch vehicle is at least partially positioned within the trough.

Embodiment 10. The system of any of embodiments 1-9 wherein the articulatable carriage comprises a rigid support pivotally mounted between a rigid at least one forward arm and a rigid at least one rearward arm, the support providing axial, lateral, and rotational stability to the launch vehicle, and the arms pivotally engaged with the support are configured for selective kinematic movement of the support and thus of the launch vehicle relative to the towed aircraft.

Embodiment 11. The system of embodiment 10 wherein the articulatable carriage is configured to be selectively free-standing to facilitate assembly of the launch vehicle thereon prior to installation within the towed aircraft.

Embodiment 12. The system of any of embodiments 1-11 wherein the articulatable carriage is installed on an upper side of the towed aircraft body such that the air-launch assembly involves a top-carry arrangement of the launch vehicle on the towed aircraft.

Embodiment 13. The system of any of embodiments 1-12 wherein the launch vehicle is selected from the group consisting of a propulsion system, an ordinance, an aero vehicle, a fairing, a projectile, a container, a carrier, and a cannister.

Embodiment 14. The system of any of embodiments 1-13 wherein the first altitude is in the range of 25,000-50,000 feet, or more particularly 35,000-40,000 feet.

Embodiment 15. The system of any of embodiments 1-14 wherein the second altitude is in the range of 35,000-75,000 feet, or more particularly 45,000-65,000 feet.

Embodiment 16. The system of any of embodiments 1-15 wherein the second altitude is more than 10,000 feet greater than the first altitude.

Embodiment 17. A method of employing a launch system as defined in any one of embodiments 1-16 for orbital or suborbital air-launch of a payload, the method comprising the steps of: releasably coupling the launch vehicle with the towed aircraft via the articulatable carriage to form the air-launch assembly; configuring the air-launch assembly in the stowed position with the launch vehicle adjacent to the towed aircraft; towing the air-launch assembly via the tow aircraft and interconnected tow cable to the first altitude; releasing the air-launch assembly from tow at or above the first altitude; activating the towed aircraft propulsion system and initiating a pull-up and climb maneuver of the towed aircraft to the second altitude, the second altitude being more than 10,000 feet higher than the first altitude; articulating the articulatable carriage to shift the air-launch assembly to the deployed position with the launch vehicle spaced from the towed aircraft so as to minimize aerodynamic influences between the launch vehicle and the towed aircraft; releasing the launch vehicle from the articulatable carriage and thus from the towed aircraft; and activating the launch vehicle propulsion system for further altitude gain or to meet specific mission requirements.

Embodiment 18. The method of embodiment 17, prior to the step of towing the air-launch assembly, comprising the further step of activating the towed aircraft propulsion system to provide take-off assist to the tow aircraft.

Embodiment 19. The method of embodiment 17 or embodiment 18, after the step of activating the towed aircraft propulsion system and prior to the step of articulating the articulatable carriage, comprising the further step of turning off the towed aircraft propulsion system.

Embodiment 20. The method of embodiment 19 wherein the step of turning off the towed aircraft propulsion system triggers the step of articulating the articulatable carriage.

Embodiment 21. The method of any of embodiments 17-20, prior to the step of releasing the air-launch assembly from tow at or above the first altitude, comprising the further step of activating the towed aircraft propulsion system to allow for recovery of the air-launch assembly in the event of air-launch abortment.

Embodiment 22. The method of any of embodiments 17-21, wherein the steps of articulating the articulatable carriage and releasing the launch vehicle from the articulatable carriage occur substantially simultaneously.

Embodiment 23. The method of any of embodiments 17-22 wherein the step of articulating the articulatable carriage comprises orienting the towed aircraft at a negative angle of attack relative to the launch vehicle.

Embodiment 24. The method of any of embodiments 17-23, after the step of releasing the launch vehicle from the towed aircraft, comprising the further step of executing an aerodynamic maneuver, such as a bunt-over maneuver, of the towed aircraft to further diverge the flight path of the towed aircraft from the flight path of the launch vehicle.

Embodiment 25. The method of any of embodiments 17-24 wherein one or more of the steps are achieved via control system automation.

Embodiment 26. The method of any of embodiments 17-25, prior to the step of releasably coupling the launch vehicle with the towed aircraft, comprising the further step of assembling the launch vehicle on the articulatable carriage.

Embodiment 27. Use of a launch system as defined in any one of embodiments 1-16 to air-launch a payload.

Embodiment 28. The use of embodiment 27, wherein the use comprises a method as defined in any one of embodiments 17-26.

In closing, regarding the exemplary embodiments of the present invention as shown and described herein, it will be appreciated that a launch system and method is disclosed for improved air-launch of a launch vehicle and related payload from a previously towed aircraft. Because the principles of the invention may be practiced in a number of configurations beyond those shown and described, it is to be understood that the invention is not in any way limited by the exemplary embodiments, but is generally able to take numerous forms in achieving such air-launch without departing from the spirit and scope of the invention. It will also be appreciated by those skilled in the art that the present invention is not limited to the particular geometries and materials of construction disclosed, but may instead entail other functionally comparable structures or materials, now known or later developed, without departing from the spirit and scope of the invention.

Certain embodiments of the present invention are described herein, including the best mode known to the inventor(s) for carrying out the invention. Of course, variations on these described embodiments will become apparent to those of ordinary skill in the art upon reading the foregoing description. The inventor(s) expect skilled artisans to employ such variations as appropriate, and the inventor(s) intend for the present invention to be practiced otherwise than specifically described herein. Accordingly, this invention includes all modifications and equivalents of the subject matter recited in the claims appended hereto as permitted by applicable law. Moreover, any combination of the above-described embodiments in all possible variations thereof is encompassed by the invention unless otherwise indicated herein or otherwise clearly contradicted by context.

Groupings of alternative embodiments, elements, or steps of the present invention are not to be construed as limitations. Each group member may be referred to and claimed individually or in any combination with other group members disclosed herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

In some embodiments, the numbers expressing quantities of components or ingredients, properties such as dimensions, weight, concentration, reaction conditions, and so forth, used to describe and claim certain embodiments of the inventive subject matter are to be understood as being modified in some instances by terms such as "about," "approximately," or "roughly." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the inventive subject matter are approximations, the numerical values set forth in any specific examples are reported as precisely as practicable. The numerical values presented in some embodiments of the inventive subject matter may contain certain errors necessarily resulting from the standard deviation found in their respective testing measurements.

Unless the context dictates the contrary, all ranges set forth herein should be interpreted as being inclusive of their endpoints and open-ended ranges should be interpreted to include only commercially practical values. The recitation of numerical ranges of values herein is merely intended to serve as a shorthand method of referring individually to each separate value falling within the range. Unless otherwise indicated herein, each individual value of a numerical range is incorporated into the specification as if it were individually recited herein. Similarly, all lists of values should be considered as inclusive of intermediate values unless the context indicates the contrary.

Use of the terms "may" or "can" in reference to an embodiment or aspect of an embodiment also carries with it the alternative meaning of "may not" or "cannot." As such, if the present specification discloses that an embodiment or an aspect of an embodiment may be or can be included as part of the inventive subject matter, then the negative limitation or exclusionary proviso is also explicitly meant, meaning that an embodiment or an aspect of an embodiment may not be or cannot be included as part of the inventive subject matter. In a similar manner, use of the term "optionally" in reference to an embodiment or aspect of an embodiment means that such embodiment or aspect of the embodiment may be included as part of the inventive subject matter or may not be included as part of the inventive subject matter. Whether such a negative limitation or exclusionary proviso applies will be based on whether the negative limitation or exclusionary proviso is recited in the claimed subject matter.

The terms "a," "an," "the" and similar references used in the context of describing the present invention (especially in the context of the following claims) are to be construed to cover both the singular and the plural, unless otherwise indicated herein or clearly contradicted by context. Further, ordinal indicators—such as "first," "second," "third," etc.—for identified elements are used to distinguish between the elements, and do not indicate or imply a required or limited number of such elements, and do not indicate a particular position or order of such elements unless otherwise specifically stated.

All methods described herein can be performed in any suitable order unless otherwise indicated herein or otherwise clearly contradicted by context. The use of any and all examples, or exemplary language (e.g., "such as") provided with respect to certain embodiments herein is intended merely to better illuminate the inventive subject matter and does not pose a limitation on the scope of the inventive subject matter otherwise claimed. No language in the application should be construed as indicating any non-claimed element essential to the practice of the invention.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

While aspects of the invention have been described with reference to at least one exemplary embodiment, it is to be clearly understood by those skilled in the art that the invention is not limited thereto. Rather, the scope of the invention is to be interpreted only in conjunction with the appended claims and it is made clear, here, that the inventor(s) believe that the claimed subject matter is the invention.

What is claimed is:

1. A method of employing a launch system for orbital or suborbital air-launch of a payload, the method comprising the steps of:
    releasably coupling a launch vehicle with a towed aircraft via an articulatable carriage to form an air-launch assembly, the articulatable carriage configured for selectively shifting the launch vehicle between a stowed position adjacent to the towed aircraft and a deployed position spaced from the towed aircraft, the launch vehicle having a launch vehicle central axis and the towed aircraft having a towed aircraft central axis;
    configuring the air-launch assembly in the stowed position with the launch vehicle adjacent to the towed aircraft;
    towing the air-launch assembly via a tow aircraft and interconnected tow cable to a first altitude;
    releasing the air-launch assembly from tow at or above the first altitude;
    activating a towed aircraft propulsion system and initiating a pull-up and climb maneuver of the towed aircraft to a second altitude;
    after the steps of releasing the air-launch assembly from tow at or above the first altitude and activating the towed aircraft propulsion system and initiating the pull-up and climb maneuver of the towed aircraft to the second altitude, articulating the articulatable carriage to shift the air-launch assembly to the deployed position with the launch vehicle spaced from the towed aircraft and with the launch vehicle central axis at an inclined angle relative to the towed aircraft central axis in the range of one to ten degrees (1-10°);
    releasing the launch vehicle from the articulatable carriage and thus from the towed aircraft; and
    powering a launch vehicle propulsion system for further altitude gain or to meet specific mission requirements.

2. The method of claim 1 comprising, prior to the step of towing the air-launch assembly, the further step of activating the towed aircraft propulsion system to provide take-off assist to the tow aircraft.

3. The method of claim 1 comprising, prior to the step of releasing the air-launch assembly from tow at or above the first altitude, the further step of activating the towed aircraft propulsion system to allow for recovery of the air-launch assembly in the event of air-launch abortment.

4. The method of claim 1 comprising, after the step of activating the towed aircraft propulsion system and prior to the step of articulating the articulatable carriage, the further step of turning off the towed aircraft propulsion system.

5. The method of claim 4 wherein the step of turning off the towed aircraft propulsion system triggers the step of articulating the articulatable carriage.

6. The method of claim 1 wherein the step of activating the towed aircraft propulsion system and initiating the pull-up and climb maneuver of the towed aircraft is such that the second altitude is more than 10,000 feet higher than the first altitude.

7. The method of claim 1 wherein the articulatable carriage reaching the deployed position and the step of releasing the launch vehicle from the articulatable carriage occur substantially simultaneously.

8. The method of claim 1 wherein the step of articulating the articulatable carriage comprises orienting the towed aircraft at a negative angle of attack relative to the launch vehicle.

9. The method of claim 1 comprising, after the step of releasing the launch vehicle from the towed aircraft, the further step of executing an aerodynamic maneuver of the towed aircraft to further diverge the flight path of the towed aircraft from the flight path of the launch vehicle.

10. The method of claim 1 wherein one or more of the steps are achieved via control system automation.

11. The method of claim 1 comprising, prior to the step of releasably coupling the launch vehicle with the towed aircraft, the further step of assembling the launch vehicle on the articulatable carriage.

* * * * *